US010902006B2

(12) United States Patent
Bax

(10) Patent No.: US 10,902,006 B2
(45) Date of Patent: Jan. 26, 2021

(54) GENERATING OPTIONS FOR A TASK USING OBJECTIVES

(71) Applicant: Yahoo Holdings, Inc., Sunnyvale, CA (US)

(72) Inventor: Eric Theodore Bax, Sierra Madre, CA (US)

(73) Assignee: Verizon Media Inc., New York, NY (US)

( * ) Notice: Subject to any disclaimer, the term of this patent is extended or adjusted under 35 U.S.C. 154(b) by 224 days.

(21) Appl. No.: 15/827,030

(22) Filed: Nov. 30, 2017

(65) Prior Publication Data

US 2019/0163757 A1 May 30, 2019

(51) Int. Cl.
| | | |
|---|---|---|
| *G06F 16/00* | (2019.01) | |
| *G06F 16/2457* | (2019.01) | |
| *H04W 4/02* | (2018.01) | |
| *H04L 29/08* | (2006.01) | |
| *G06Q 30/06* | (2012.01) | |
| *G06Q 30/02* | (2012.01) | |

(52) U.S. Cl.
CPC .. *G06F 16/24578* (2019.01); *G06F 16/24575* (2019.01); *G06Q 30/02* (2013.01); *G06Q 30/0269* (2013.01); *G06Q 30/0631* (2013.01); *H04L 67/18* (2013.01); *H04L 67/306* (2013.01); *H04W 4/02* (2013.01)

(58) Field of Classification Search
CPC ......... G06F 16/24578; G06F 16/24575; H04L 67/306; H04W 4/02
USPC ......................................................... 707/748
See application file for complete search history.

(56) References Cited

U.S. PATENT DOCUMENTS

| | | | | |
|---|---|---|---|---|
| 2011/0040756 A1* | 2/2011 | Jones | ..................... | G06F 16/951 707/737 |
| 2011/0231243 A1* | 9/2011 | Bhatia | .................... | G06Q 30/02 705/14.43 |
| 2011/0282902 A1* | 11/2011 | Zito | .................. | G06F 16/24578 707/769 |
| 2013/0290110 A1* | 10/2013 | LuVogt | ............... | G06F 16/9535 705/14.66 |
| 2014/0095433 A1* | 4/2014 | Cort | ........................ | G06F 3/048 707/610 |
| 2014/0222800 A1* | 8/2014 | Vadrevu | ............ | G06F 16/24578 707/724 |
| 2015/0195379 A1* | 7/2015 | Zhang | ................. | G06F 16/9577 709/219 |
| 2015/0254365 A1* | 9/2015 | Sadri | ..................... | G06F 16/972 707/769 |
| 2016/0012055 A1* | 1/2016 | Bai | ..................... | G06F 16/9535 707/734 |

* cited by examiner

*Primary Examiner* — Monica M Pyo
(74) *Attorney, Agent, or Firm* — Cooper Legal Group, LLC

(57) ABSTRACT

One or more computing devices, systems, and/or methods for generating options associated with a task are provided. For example, a request to generate options associated with a task may be received via a device. Responsive to receiving the request, an option database may be analyzed based upon the task to generate a plurality of options associated with the task. One or more personality profiles may be selected from a plurality of personality profiles for the request, wherein each personality profile represents at least one objective. The plurality of options may be ranked based upon the one or more personality profiles to generate a ranked list of options. At least a portion of the ranked list may be presented.

20 Claims, 21 Drawing Sheets

501 ⟶

550 ⟶

SERVICES INTERFACE - BACKEND

INPUT MESSAGE:

I'd like directions to Civic Park — 520

TASK DETERMINED BASED UPON INPUT MESSAGE:

PROVIDE GPS DIRECTIONS FOR USER FROM CURRENT LOCATION TO CIVIC PARK — 522

PLURALITY OF OPTIONS GENERATED BASED UPON ANALYSIS OF OPTION DATABASE:

- ROUTE VIA MEADOWBROOK AVENUE
- ROUTE VIA LEE ROAD
- ROUTE VIA CEDAR ROAD

— 524

PERSONALITY PROFILES SELECTED:

- SAM: GET TO DESTINATION QUICKLY, 33%
- SALLY: MORE NATURAL SCENERY, 33%
- HAROLD: LESS HEAVY TRAFFIC, 33%

SERVICES INTERFACE - BACKEND

UPDATED PERSONALITY PROFILES SELECTED:

- SAM: SHORTER TIMELENGTH, 25%
- SALLY: MORE NATURAL SCENERY, 25%
- HAROLD: LESS HEAVY TRAFFIC, 25%
- ALISTAIR: MORE WEALTHY AREAS, 25%

RANKED LIST OF OPTIONS BASED UPON PLURALITY OF OPTIONS AND PERSONALITY PROFILES SELECTED:

1. ROUTE VIA CEDAR ROAD
2. ROUTE VIA LEE ROAD
3. ROUTE VIA MEADOWBROOK AVENUE

SERVICES INTERFACE - BACKEND

UPDATED PERSONALITY PROFILES SELECTED:

- STEVE: LOWER PRICES, 20%
- TAYLOR: MORE QUIET, 20%
- DAVID: FASTER RESTAURANT SERVICE, 20%
- TIMOTHY: AMERICAN FOOD, 40%

— 648

RANKED LIST OF OPTIONS GENERATED BASED UPON PERSONALITY PROFILES AND ANALYSIS OF OPTION DATABASE:

1. BURGERS TO-GO
2. FRIED CHICKEN WORLD
3. SANDWICH PARADISE

SERVICES INTERFACE - BACKEND

INPUT MESSAGE:

I'd like to watch a movie ⟵ 720

TASK DETERMINED BASED UPON INPUT MESSAGE:

PROVIDE MOVIE OPTIONS FOR USER ⟵ 722

PERSONALITY PROFILES SELECTED:

- DANIEL: DRAMA MOVIES, 40%  ⟵ 724
- NATALIE: MOVIES WITH FAMOUS ACTORS, 30%
- GEORGE: CRITICALLY ACCLAIMED MOVIES, 30%

PLURALITY OF OPTIONS GENERATED BASED UPON ANALYSIS OF OPTION DATABASE AND DRAMA MOVIES OBJECTIVE:

⟵ 726
- A SHOE IN THE SKY
- THE DILEMMA IN THE MIDWEST
- THE NEW RULE

FIG. 7B

SERVICES INTERFACE - BACKEND

UPDATED PERSONALITY PROFILES SELECTED:

- DANIEL: DRAMA MOVIES, 30%
- NATALIE: MOVIES WITH FAMOUS ACTORS, 20%    — 748
- GEORGE: CRITICALLY ACCLAIMED MOVIES, 20%
- MIKE: ADVENTURE MOVIES, 30%

RANKED LIST OF OPTIONS GENERATED BASED UPON PLURALITY OF OPTIONS AND PERSONALITY PROFILES SELECTED:

1. THE DILEMMA IN THE MIDWEST    — 752
2. A SHOE IN THE SKY
3. THE NEW RULE

FIG. 7D

GENERATING OPTIONS FOR A TASK USING OBJECTIVES

BACKGROUND

Many services, such as websites, applications, social networks, etc., may employ various techniques to help a user to perform a task. For example, the user may want to find directions to a location, find a suitable restaurant, find a suitable movie, etc. In an example, the user may have certain preferences for the task. For example, the user may prefer to drive through wealthy areas and pass by historical buildings. Performance of the task based upon the preferences may consume a significant amount of attention, time and/or resources of the user (e.g., to find the location, to find one or more historical buildings, to find one or more wealthy areas, to determine a route that includes the one or more historical buildings and the one or more wealthy areas from a current location to the location, etc.).

SUMMARY

In accordance with the present disclosure, one or more computing devices and/or methods are provided. In an example, a request to generate options associated with a task may be received via a device. Responsive to receiving the request, an option database may be analyzed based upon the task to generate a plurality of options associated with the task. One or more personality profiles may be selected from a plurality of personality profiles, for the request, wherein each personality profile represents at least one objective. The plurality of options may be ranked based upon the one or more personality profiles to generate a ranked list of options. At least a portion of the ranked list may be presented.

In an example, a request to generate options associated with a task may be received via a device. One or more personality profiles may be selected from a plurality of personality profiles, for the request, wherein each personality profile represents at least one objective. An option database may be analyzed based upon the task and the one or more personality profiles to generate a ranked list of options associated with the task. At least a portion of the ranked list may be presented.

In an example, a request to generate options associated with a task may be received via a device. A first plurality of personality profiles may be selected from a second plurality of personality profiles, for the request, wherein each personality profile represents at least one objective. An option database may be analyzed based upon the task and a portion of the first plurality of personality profiles but not a second portion of the first plurality of personality profiles to generate a plurality of options associated with the task. The plurality of options may be ranked based upon the first plurality of personality profiles to generate a ranked list of options. At least a portion of the ranked list of options may be presented.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5B is a component block diagram illustrating an example system for generating options associated with a task, where a task is determined and a plurality of options is generated.

FIG. 5D is a component block diagram illustrating an example system for generating options associated with a task, where a plurality of options is ranked.

FIG. 6D is a component block diagram illustrating an example system for generating options associated with a task, where a ranked list is generated.

FIG. 7B is a component block diagram illustrating an example system for generating options associated with a task, where a task is determined and a plurality of options is generated.

FIG. 7D is a component block diagram illustrating an example system for generating options associated with a task, where a plurality of options is ranked.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
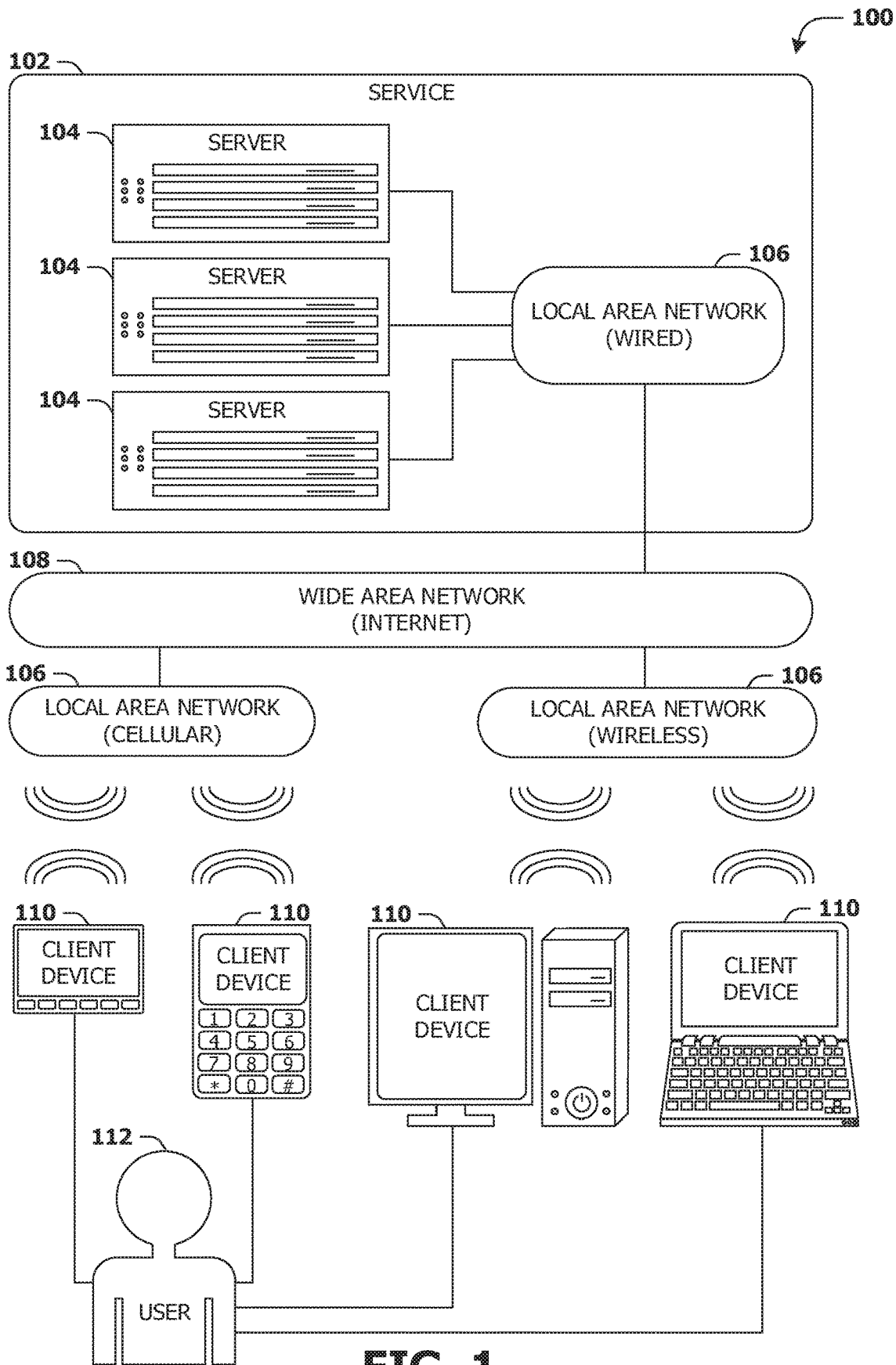
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
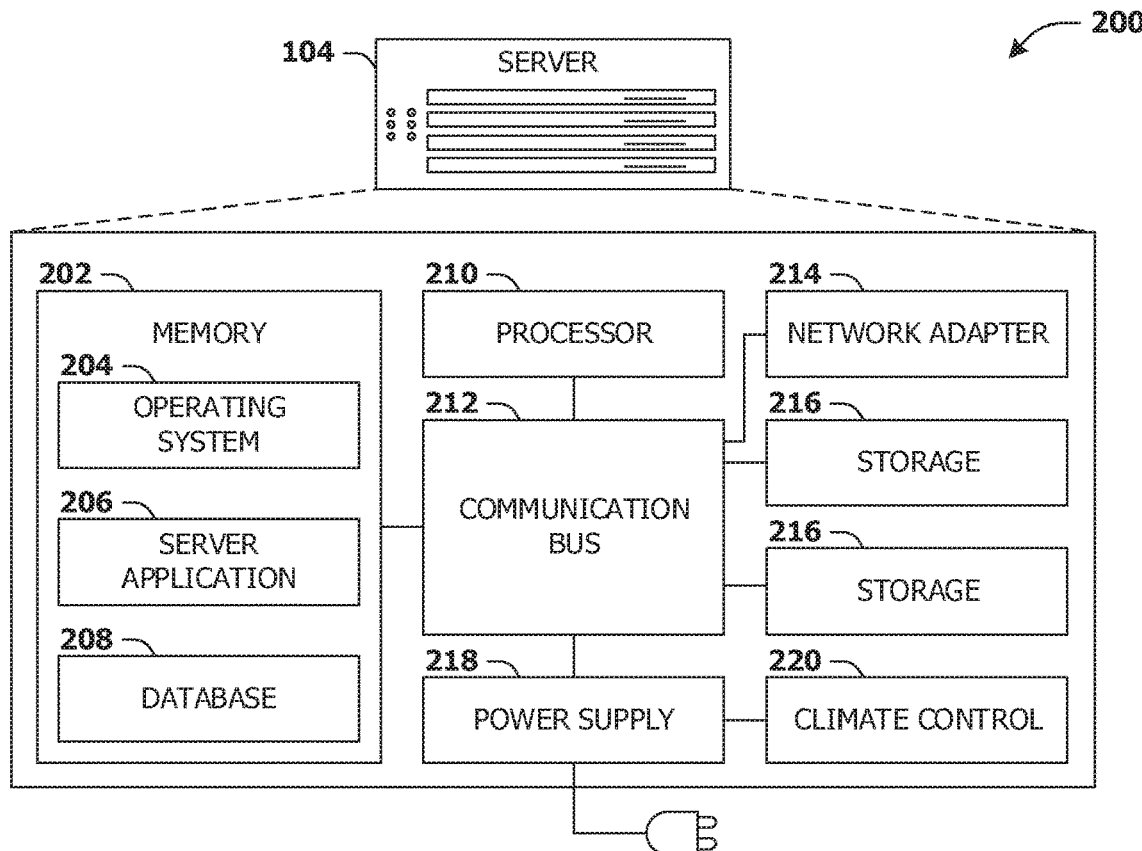
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
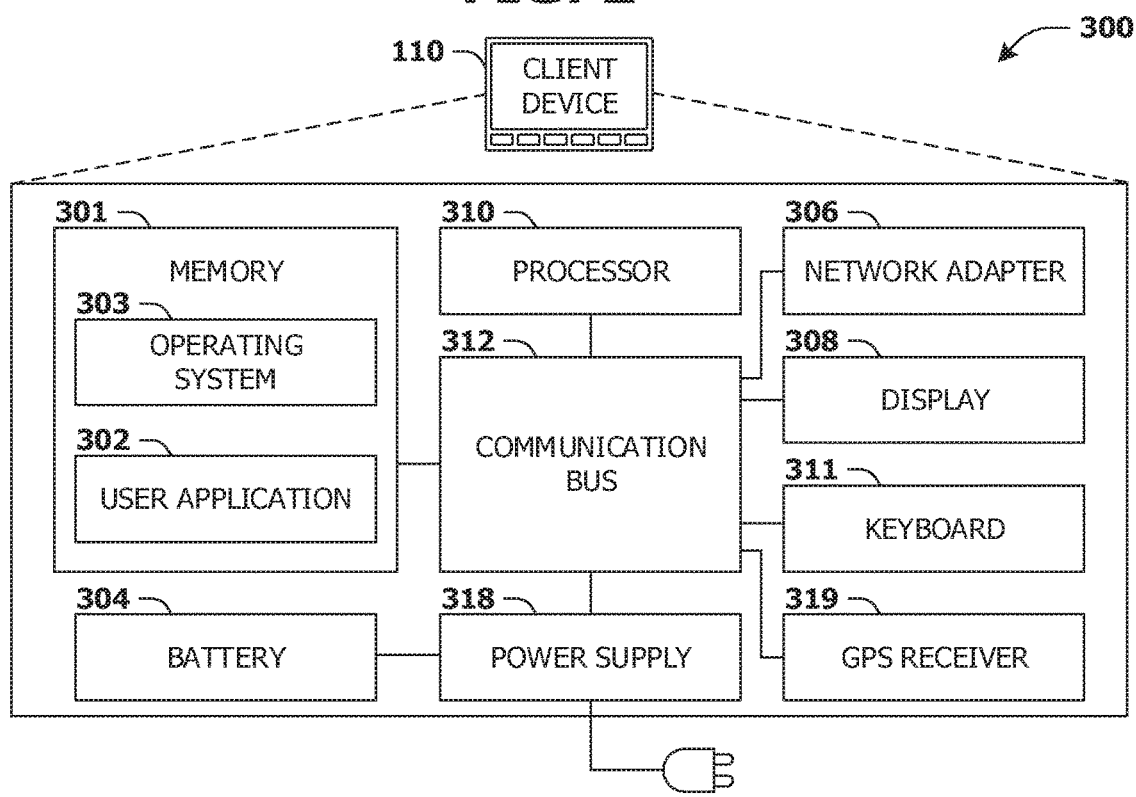
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating options for a task based upon one or more objectives are provided. For example, a user may want to perform a task (e.g., finding directions to a location, finding a suitable restaurant, finding a suitable movie, etc.). In an example, the task may comprise finding directions to a location. The user may have certain preferences for the task. For example, the user may prefer to drive through wealthy areas and pass by historical buildings.

Performance of the task based upon the preferences may use and/or require one or more pieces of information, and thus may consume a significant amount of attention, time and/or resources of the user (e.g., to find the location, to find one or more historical buildings, to find one or more wealthy areas, to determine a route that includes the one or more historical buildings and the one or more wealthy areas from a current location to the location, etc.).

One or more interfaces on a device of the user may provide a platform for the user to select one or more objectives for the task via one or more personality profiles corresponding to the preferences of the user. Alternatively and/or additionally, one or more objectives may be (e.g., automatically) selected for the user based upon information about the user. Options for the task may be generated (e.g., and/or ranked) based upon the objectives (e.g., corresponding to the preferences of the user) and presented to the user. Alternative options corresponding to alternative objectives and alternative personality profiles may (e.g., also) be presented to the user to allow the user to choose from the options and the alternative options and/or to choose personality profiles.

In some examples, one or more of the options for the task may be used to control the device (e.g., and/or an associated device, such as one linked to the device via a network, a common user, etc.) in order to facilitate performance of the task. For example, electronic instructions may be generated based upon the one or more options. The electronic instructions may control what is displayed on a graphical user interface of the device (e.g., and/or the associated device). For example, at least some options that correspond to the personality profiles selected for the user may be (e.g., visually) distinguished from at least some options that do not correspond to the personality profiles selected for the user. The graphical user interface may be used to guide a user (e.g., a driver of a motor vehicle) in performing the task.

Alternatively and/or additionally, the electronic instructions may be used to control the device (e.g., and/or the associated device) to perform the task. For example, a computer of the motor vehicle may be controlled based upon the instructions to cause the motor vehicle to perform the task in accordance with the one or more options. The computer of motor vehicle may be given instructions on a route to take, for example. The computer of the motor vehicle may use the electronic instructions to modify one or more settings of the motor vehicle, (e.g., automatically) drive on the route, control a display of the motor vehicle, etc.

Figure 4A:
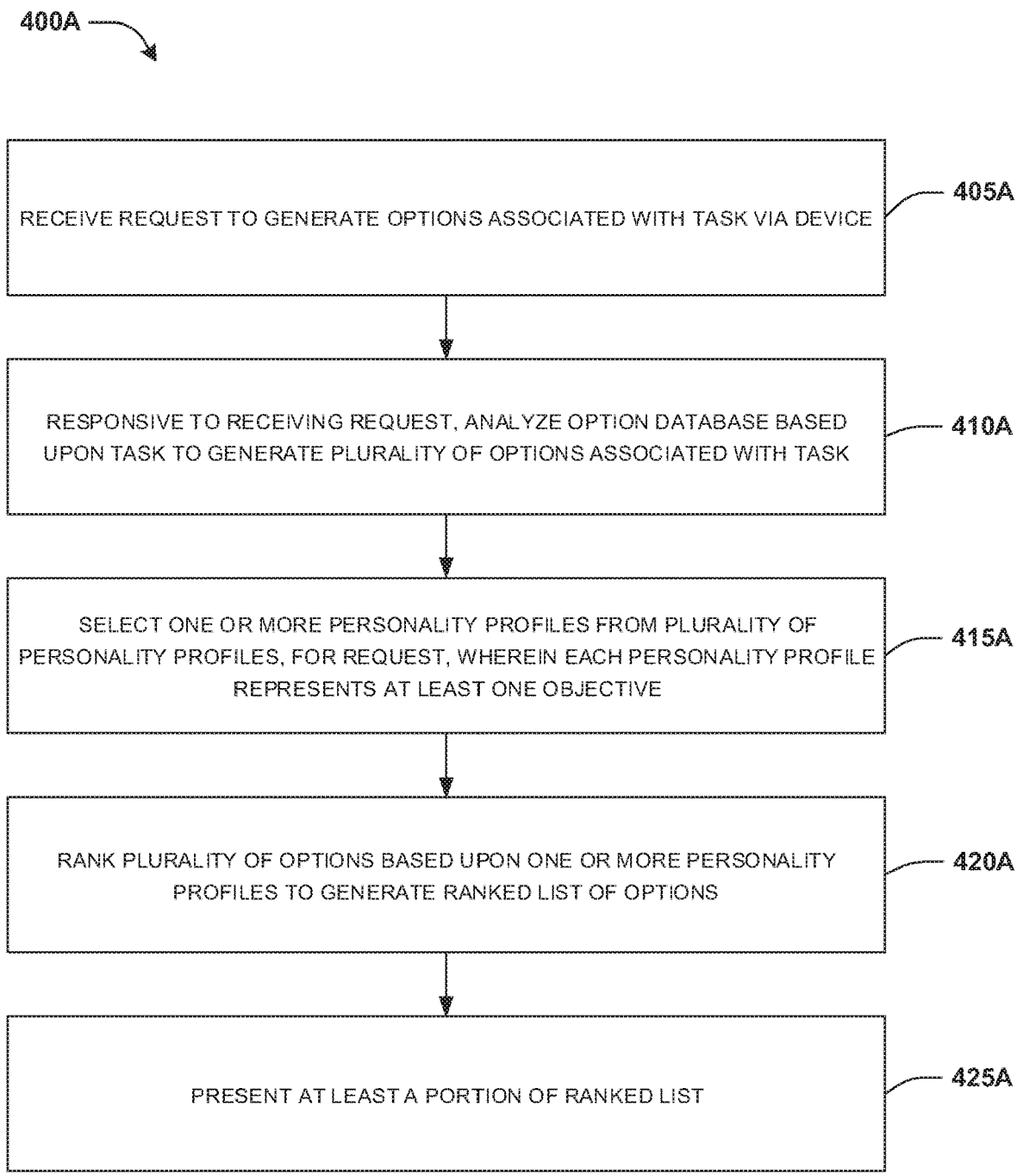
FIG. 4A is a flow chart illustrating an example method for generating options associated with a task.

An embodiment of generating options associated with a task is illustrated by an example method 400A of FIG. 4A. A user, such as user Jill, may access and/or interact with one or more interfaces on a device of the user, such as a website, an application, etc. that provides services using a server (e.g., of the website, the application, etc.). Accordingly, at 405A, a request to generate options associated with a task (e.g., that the user may intend to perform) may be received via the device (e.g., by the server). In some examples, the request may be received by using a conversational interface (e.g., a voice recognition and natural language interface), a touchscreen, a switch (e.g., an interface comprising one or more buttons), a messaging interface and/or a different type of interface.

The task (e.g., finding directions to a location, finding a suitable restaurant, finding a suitable movie, etc.) may be determined (e.g., identified, predicted, selected, etc.) based upon the request. In an example, one or more sentences of the request may be analyzed and/or scanned for keywords to determine the task. At 410A, responsive to receiving the request, an option database may be analyzed (e.g., and/or scanned) based upon the task to generate a plurality of options associated with the task. In some examples, the option database may be analyzed (e.g., and/or scanned) based upon context of the request. The context may comprise a location of the request (e.g., a location of the user and/or the device), a time of the request, an age of the user and/or a (e.g., past) behavior of the user and/or the device.

In some examples, the option database may be stored on the device and/or on a server accessed by the device via a network connection. In an example, the option database may be dynamically updated to improve one or more options and/or to introduce one or more new options (e.g., based upon information associated with the user, based upon a trend among a plurality of users, in response to a request by one or more users, etc.). In some examples, each option in the option database may be linked with an identifier identifying one or more types of options. For example, a first set of options of the option database may (e.g., each) be linked with a first identifier identifying a first type of option (e.g., restaurant options) and a second set of options of the option database may (e.g., each) be linked with a second identifier identifying a second type of option (e.g., driving directions). Alternatively and/or additionally, a third set of options of the option database may (e.g., each) be linked with a third identifier identifying the first type of option (e.g., restaurant options) and a third type of option (e.g., nightlife options).

At 415A, one or more personality profiles may be selected from a plurality of personality profiles, for the request. Each personality profile may represent at least one objective. The plurality of personality profiles may be comprised within a personality profile database. Each personality profile may comprise a name (e.g., character) and/or a graphic. For example, the name may comprise a name of a person (e.g., Steve, Sally, Harold, Anne, etc.), an animal (e.g., Cheetah, Turtle, etc.), a word (e.g., Sightseer, Explorer, Time-saver, etc.) and/or a phrase (e.g., Built to explore, Race against time, etc.). Alternatively and/or additionally, the graphic may correspond to the name (e.g., a graphic of a cheetah corresponding to Cheetah, a graphic of a person corresponding to Steve, a graphic of a mountain corresponding to Explorer, etc.). Each personality profile may represent an objective associated with the task. The objective may comprise a preference associated with the task. For example, a first personality profile Cheetah comprising a first name (e.g., Cheetah), may represent a first objective (e.g., get to destination quickly). A second personality profile Sally comprising a second name (e.g., Sally), may represent a second objective (e.g., more natural scenery).

In some examples, the personality profile database may be stored on the device and/or on a server accessed by the device via a network connection. In an example, the personality profile database may be dynamically updated to improve one or more personality profiles and/or to introduce one or more new personality profiles (e.g., based upon information associated with the user, based upon a trend among a plurality of users, in response to a request by one or more users, etc.). In some examples, each personality profile of the personality profile database may be linked with an identifier identifying one or more types of personality profiles (e.g., and/or one or more types of objectives). For example, a first set of personality profiles of the personality profile database may (e.g., each) be linked with a first identifier identifying a first type of objective (e.g., for selecting restaurant options). A second set of personality profiles of the personality profile database may (e.g., each) be linked with a second identifier identifying a second type of objective (e.g., for selecting driving directions). Alternatively and/or additionally, a third set of personality profiles of the personality profile database may (e.g., each) be linked with a third identifier identifying the first type of objective (e.g., for selecting restaurant options) and a third type of objective (e.g., for selecting nightlife destinations).

In some examples, information may be retrieved (e.g., by the server and/or the device) about (e.g., past) behavior, settings, age and/or a location of the device and/or the user. One or more personality profiles may be selected (e.g., automatically) based upon the information. In some examples, a portion of the plurality of personality profiles and/or the plurality of personality profiles may be presented (e.g., to the user). In some examples, the portion of the plurality of personality profiles and/or the plurality of personality profiles may be presented visually by displaying the portion of the plurality of personality profiles and/or the plurality of personality profiles on a screen graphically. For example, a name of a personality profile, a graphic of the personality profile and/or a description of an objective corresponding to the personality profile may be displayed graphically. For example, the first name (e.g., Cheetah) of the first personality profile Cheetah, a first graphic (e.g., representing the first personality profile Cheetah) and/or a first description of the first objective (e.g., who likes to get places quickly, get to destination quickly, etc.) may be displayed graphically. Alternatively and/or additionally, the portion of the plurality of personality profiles and/or the plurality of personality profiles may be presented audibly by playing the portion of the plurality of personality profiles and/or the plurality of personality profiles on a speaker. For example, audio may be generated based upon a name of a personality profile and/or a description of an objective corresponding to the personality profile. The audio may be output via the speaker. For example, the first name (e.g., Cheetah) of the first personality profile Cheetah and/or the first description of the first objective (e.g., who likes to get places quickly, get to destination quickly, etc.) may be presented audibly. In some examples, one or more interfaces may provide a platform for browsing, viewing, downloading and/or searching for personality profiles (e.g., such that the user may select one or more personality profiles of the plurality of personality profiles). In some examples, personality profiles may be purchased (e.g., by users) on the platform and/or downloaded (e.g., and/or selected) without payment.

In some examples, the portion of the plurality of personality profiles may be presented (e.g., to the user) based upon the information and/or one or more personality profiles (e.g., previously) selected from the plurality of personality profiles. It may be appreciated that the selection of the portion of the plurality of personality profiles (e.g., presented to the user) may be reflective of a determination (e.g., prediction) that the user is likely to favor one or more personality profiles of the portion of the plurality of personality profiles. One or more personality profiles of the plurality of personality profiles may be selected by the user and/or the device. For example, a request to select the first personality profile Cheetah of the plurality of personality profiles may be received (e.g., by the server and/or the device). In some examples, the request may be received by using a conversational interface (e.g., a voice recognition and natural language interface), a touchscreen, a switch (e.g., an interface comprising one or more buttons), a messaging interface and/or a different type of interface. Responsive to receiving the request, the first personality profile Cheetah may be selected and stored in a memory structure. The first personality profile Cheetah may (e.g., later) be retrieved from the memory structure and selected for a second task.

In some examples, one or more personality profiles (e.g., previously) selected from the plurality of personality profiles may have been stored in a memory structure and linked to the user and/or the device. Accordingly, the one or more person personality profiles may (e.g., automatically) be selected by retrieving the one or more personality profiles (e.g., linked to the user and/or the device) from the memory structure.

In some examples, one or more weights (e.g., priorities) corresponding to one or more personality profiles selected from the plurality of personality profiles may be determined. In some examples, a weight may indicate a priority, influence, importance, etc. of a personality profile of the one or more personality profiles. In some examples, the one or more weights may be selected by the user and/or the device. For example, the one or more weights may be determined by (e.g., the user and/or the device) selecting (e.g., and/or entering as input) one or more values (e.g., 0.1, 0.2, 0.3, etc. and/or 10%, 20%, 30%, etc.) (e.g., each) corresponding to the weight. Alternatively and/or additionally, the one or more weights may be determined by (e.g., the user and/or the device) selecting one or more of a plurality of weight options (e.g., low priority, normal priority, high priority, etc.). For example, the one or more weights may be generated based upon the one or more weight options.

In some examples, (e.g., the selection of) the one or more weights and/or the one or more weight options may be received by using a conversational interface (e.g., a voice recognition and natural language interface), a touchscreen, a switch (e.g., an interface comprising one or more buttons), a messaging interface and/or a different type of interface. Responsive to receiving the one or more weights, the one or more weights may be stored in a memory structure. The one or more weights may (e.g., later) be retrieved from the memory structure (e.g., with the one or more personality profiles corresponding to the one or more weights). In some examples, the one or more weights may be (e.g., automatically) determined based upon the information, one or more personality profiles and/or one or more weights (e.g., previously) selected (e.g., by the same user, on the same device, etc.).

In an example, the first personality profile Cheetah representing the first objective (e.g., get to destination quickly) may have a first weight and the second personality profile Sally representing the second objective (e.g., more natural scenery) may have a second weight. In some examples, the first weight may be greater than the second weight. For example, the first weight may comprise a first value (e.g., 0.6, 0.7, 0.8, 0.9, etc. and/or 60%, 70%, 80%, 90%, etc.) that is greater than a second value of the second weight (e.g., 0.4, 0.3, 0.2, 0.1, etc. and/or 40%, 30%, 20%, 10%, etc.). In some examples, the first weight may correspond to a first weight option (e.g., high priority) and the second weight may correspond to a second weight option (e.g., low priority). Alternatively and/or additionally, the first weight may be equal to the second weight. For example, the first value (e.g., 0.5) may be equal to the second value (e.g., 0.5). In some examples, the first weight option (e.g., normal priority) may be the same as the second weight option (e.g., normal priority).

In some examples, an agent may be generated (e.g., by the server and/or the device) based upon the one or more personality profiles selected from the plurality of personality profiles and/or the one or more weights corresponding to the one or more personality profiles. The agent may comprise (e.g., and/or represent) the one or more personality profiles and/or the one or more weights corresponding to the one or more personality profiles. The agent may be stored in a memory structure. The agent may (e.g., later) be retrieved from the memory structure for a second task. In some examples, the agent may be transmitted (e.g., shared) to one or more other devices using a network connection, a social network, an application, email, instant messaging, etc.

In some examples, the agent (e.g., and/or the one or more personality profiles and/or the one or more weights) and/or a plurality of agents corresponding to a plurality of users may be analyzed to determine one or more other users similar to the user. In some examples, a platform for messaging, connecting with and/or talking to the one or more other users similar to the user may be provided. In some examples, the agent (e.g., and/or the one or more personality profiles and/or the one or more weights) may be analyzed to determine one or more advertisements to present to the user. The one or more advertisements may be presented to the user visually and/or audibly. It may be appreciated that the presentation of the one or more advertisements may be reflective of a determination that the user is likely to respond to the one or more advertisements based upon the agent and/or personality profiles associated with the user.

At 420A, the plurality of options may be ranked based upon the one or more personality profiles to generate a ranked list of options. In some examples, the plurality of options may be ranked based upon the agent (e.g., the one or more personality profiles and/or the one or more weights corresponding to the one or more personality profiles) to generate the ranked list. In some examples, the plurality of options may be (e.g., further) ranked based upon (e.g., past) behavior, settings, age and/or a location of the device and/or the user. Alternatively and/or additionally, the plurality of options may be (e.g., further) ranked based upon (e.g., past) behaviors, settings, ages and/or locations associated with users other than the user.

For example, the plurality of options (e.g., for driving directions) may be ranked based upon the first personality profile Cheetah representing the first objective (e.g., get to destination quickly), the first weight corresponding to the first personality profile Cheetah, the second personality profile Sally representing the second objective (e.g., more natural scenery) and/or the second weight corresponding to the second personality profile Sally. Accordingly, the plurality of options may be ranked such that options that provide (e.g., a combination of) quicker routes and more natural scenery may be ranked above other options that provide (e.g., combinations of) less quick routes and less natural scenery.

At 425A, at least a portion of the ranked list may be presented. In some examples, the ranked list may be presented (e.g., to the user). Alternatively and/or additionally, one or more options of the plurality of options (e.g., a portion of the ranked list) may be presented (e.g., to the user). In some examples, the one or more options and/or the ranked list may be presented visually by displaying the one or more options and/or the ranked list on a screen graphically. Alternatively and/or additionally, the one or more options and/or the ranked list may be presented audibly by playing the one or more options and/or the ranked list on a speaker. Alternatively and/or additionally, the one or more options and/or the ranked list may be used to control the device (e.g., and/or an associated device, such as one linked to the device via a network, a common user, etc.) in order to facilitate performance of the task.

In some examples, a determination may be made that the one or more options presented are ranked above a threshold (e.g., but that one or more other options in the plurality of options are not ranked above the threshold). The one or more options may thus be selected for presentation based upon the determination that the one or more options are ranked above the threshold (e.g., but that the one or more other options in the plurality of options may not be selected for presentation based upon the determination that they are not ranked above the threshold). For example, the top X (e.g., 1, 2, 3, 4 . . . ) ranked options of the list of ranked options may be selected for presentation. It may be appreciated that the selection of the one or more options may be reflective of a determination that the user is likely to favor the one or more options.

In some examples, one or more alternative options other than the one or more options selected for presentation and/or the plurality of options generated based upon the option database may be presented (e.g., to the user). The one or more alternative options may (e.g., each) be associated with one or more alternative personality profiles other than the one or more personality profiles selected from the plurality of personality profiles. The one or more alternative options and/or the one or more alternative personality profiles may be selected based upon (e.g., past) behavior, settings, age and/or a location of the device and/or the user and/or the one or more personality profiles selected from the plurality of personality profiles.

Alternatively and/or additionally, the one or more alternative options and/or the one or more alternative personality profiles may be selected based upon (e.g., past) behavior, settings, age and/or locations associated with users other than the user. It may be appreciated that the selection of the one or more alternative options and/or the one or more alternative personality profiles may be reflective of a determination that the user is likely to favor the one or more alternative options and/or the one or more alternative personality profiles. In some examples, the one or more alternative options may be presented amongst the one or more options (e.g., without distinction between the two groups), while in other examples, the one or more alternative options may be presented separate from the one or more options.

Figure 4B:
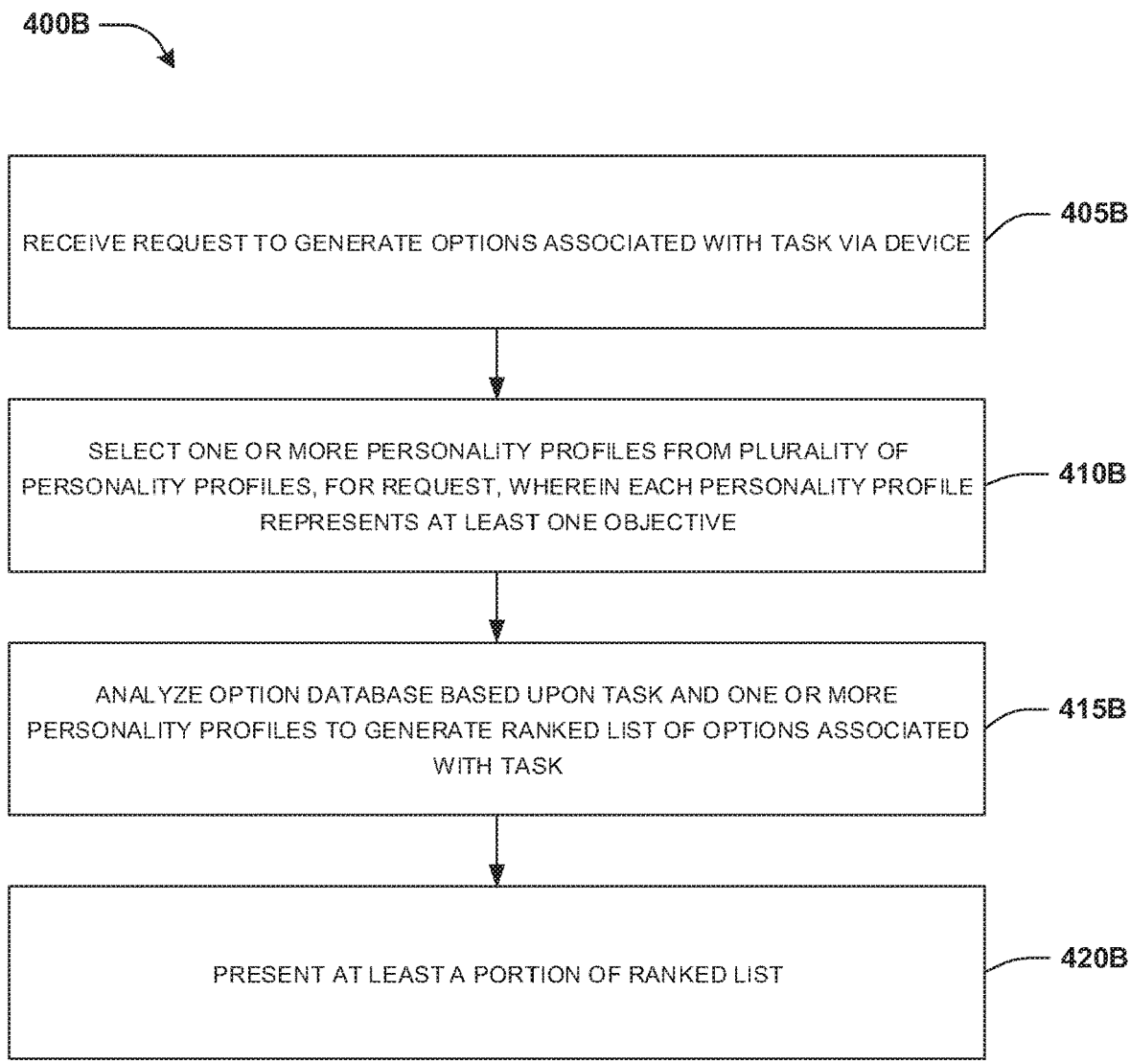
FIG. 4B is a flow chart illustrating an example method for generating options associated with a task.

An embodiment of generating options associated with a task is illustrated by an example method 400B of FIG. 4B. A user, such as user Jill, may access and/or interact with one or more interfaces on a device of the user, such as a website, an application, etc. that provides services using a server (e.g., of the website, the application, etc.). Accordingly, at 405B, a request to generate options associated with a task (e.g., that the user may intend to perform) may be received via the device (e.g., by the server). The task may be determined (e.g., identified, predicted, selected, etc.) based upon the request. In an example, one or more sentences of the request may be analyzed and/or scanned for keywords to determine the task.

At 410B, one or more personality profiles may be selected from a plurality of personality profiles, for the request. Each personality profile may represent at least one objective. The plurality of personality profiles may be comprised within a personality profile database. Each personality profile may comprise a name (e.g., character) and/or a graphic. Each personality profile may represent an objective associated with the task. The objective may comprise a preference associated with the task. For example, a first personality profile Cheetah comprising a first name (e.g., Cheetah), may represent a first objective (e.g., get to destination quickly). A second personality profile Sally comprising a second name (e.g., Sally), may represent a second objective (e.g., more natural scenery).

In some examples, information may be retrieved (e.g., by the server and/or the device) about (e.g., past) behavior, settings, age and/or a location of the device and/or the user. One or more personality profiles may be selected (e.g., automatically) based upon the information. In some examples, a portion of the plurality of personality profiles and/or the plurality of personality profiles may be presented (e.g., to the user). In some examples, the portion of the plurality of personality profiles and/or the plurality of personality profiles may be presented visually by displaying the portion of the plurality of personality profiles and/or the plurality of personality profiles on a screen graphically. Alternatively and/or additionally, the portion of the plurality of personality profiles and/or the plurality of personality profiles may be presented audibly by playing the portion of the plurality of personality profiles and/or the plurality of personality profiles on a speaker. In some examples, one or more interfaces may provide a platform for browsing, viewing, downloading and/or searching for personality profiles.

In some examples, the portion of the plurality of personality profiles may be presented (e.g., to the user) based upon the information and/or one or more personality profiles (e.g., previously) selected from the plurality of personality profiles. It may be appreciated that the selection of the portion of the plurality of personality profiles (e.g., presented to the user) may be reflective of a determination (e.g., prediction) that the user is likely to favor one or more personality profiles of the portion of the plurality of personality profiles. One or more personality profiles of the plurality of personality profiles may be selected by the user and/or the device. For example, a request to select the first personality profile Cheetah of the plurality of personality profiles may be received (e.g., by the server and/or the device). Responsive to receiving the request, the first personality profile Cheetah may be selected and stored in a memory structure. The first personality profile Cheetah may (e.g., later) be retrieved from the memory structure and selected for a second task.

In some examples, one or more weights (e.g., priorities) corresponding to one or more personality profiles selected from the plurality of personality profiles may be determined. In some examples, a weight may indicate a priority, influence, importance, etc. of a personality profile of the one or more personality profiles. In some examples, the one or more weights may be selected by the user and/or the device. Responsive to receiving the one or more weights, the one or more weights may be stored in a memory structure. The one or more weights may (e.g., later) be retrieved from the memory structure (e.g., with the one or more personality profiles corresponding to the one or more weights). In some examples, the one or more weights may be (e.g., automatically) determined based upon the information, one or more personality profiles and/or one or more weights (e.g., previously) selected.

In some examples, an agent may be generated (e.g., by the server and/or the device) based upon the one or more personality profiles selected from the plurality of personality profiles and/or the one or more weights corresponding to the one or more personality profiles. The agent may comprise (e.g., and/or represent) the one or more personality profiles and/or the one or more weights corresponding to the one or more personality profiles. The agent may be stored in a memory structure. The agent may (e.g., later) be retrieved from the memory structure for a second task. In some examples, the agent may be transmitted (e.g., shared) to one or more other devices using a network connection, a social network, an application, etc.

At 415B, an option database may be analyzed (e.g., and/or scanned) based upon the task and the one or more personality profiles (e.g., selected from the plurality of personality profiles) to generate a ranked list of options associated with the task. In some examples, the ranked list may be generated based upon the agent (e.g., the one or more personality profiles and/or the one or more weights corresponding to the one or more personality profiles). In some examples, the option database may be analyzed (e.g., and/or scanned) based upon context of the request. The context may comprise a location of the request (e.g., a location of the user and/or the device), a time of the request, an age of the user and/or a (e.g., past) behavior of the user and/or the device.

In some examples, the option database may be analyzed (e.g., and/or scanned) based upon the task, the one or more weights and/or the one or more personality profiles to generate a plurality of options associated with the task. For example, the plurality of options may be generated based upon the task (e.g., for driving directions), the first personality profile Cheetah representing the first objective (e.g., get to destination quickly), a first weight corresponding to the first personality profile Cheetah, the second personality profile Sally representing the second objective (e.g., more natural scenery) and/or the second weight corresponding to the second personality profile Sally. Accordingly, the plurality of options may be generated such that each of the plurality of options provides combinations of quicker routes with more natural scenery.

In some examples, the plurality of options may be ranked based upon the one or more personality profiles and/or the one or more weights to generate the ranked list associated with the task. For example, the plurality of options (e.g., for driving directions) may be ranked based upon the first personality profile Cheetah, the first weight, the second personality profile Sally and/or the second weight. Accordingly, the plurality of options may be ranked such that options that provide (e.g., a combination of) quicker routes and more natural scenery may be ranked above other options that provide (e.g., a combination of) less quick routes and less natural scenery.

It may be appreciated that in method 400B, the option database may be analyzed (e.g., and/or scanned) based upon the task and the one or more personality profiles (e.g., and/or the one or more weights corresponding to the personality profiles) to generate the ranked list. Accordingly, the option database may be analyzed (e.g., and/or scanned) based upon the task and the one or more personality profiles (e.g., and/or the one or more weights), directly, to generate the plurality of options. The plurality of options may (e.g., then) be ranked based upon the one or more personality profiles (e.g., and/or the one or more weights) to generate the ranked list. This may distinguish method 400B from one or more other methods that do not analyze the option database based upon the one or more personality profiles to generate the plurality of options.

At 420B, at least a portion of the ranked list may be presented. In some examples, the ranked list may be presented (e.g., to the user). Alternatively and/or additionally, one or more options of the plurality of options (e.g., a portion of the ranked list) may be presented (e.g., to the user). In some examples, the one or more options and/or the ranked list may be presented visually by displaying the one or more options and/or the ranked list on a screen graphically. Alternatively and/or additionally, the one or more options and/or the ranked list may be presented audibly by playing the one or more options and/or the ranked list on a speaker. Alternatively and/or additionally, the one or more options and/or the ranked list may be used to control the device (e.g., and/or an associated device, such as one linked to the device via a network, a common user, etc.) in order to facilitate performance of the task.

Figure 4C:
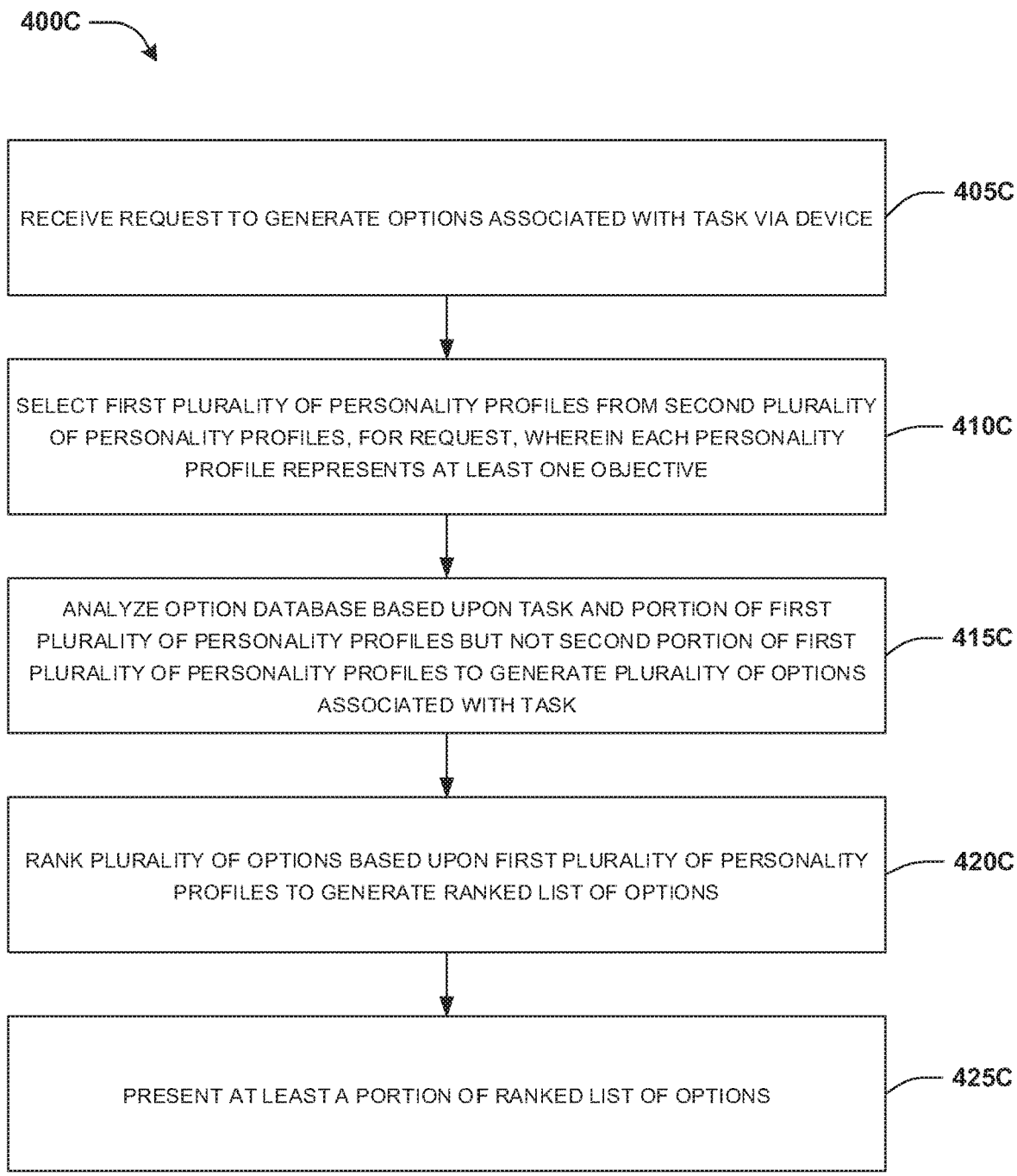
FIG. 4C is a flow chart illustrating an example method for generating options associated with a task.

An embodiment of generating options associated with a task is illustrated by an example method 400C of FIG. 4C. A user, such as user Jill, may access and/or interact with one or more interfaces on a device of the user, such as a website, an application, etc. that provides services using a server (e.g., of the website, the application, etc.). Accordingly, at 405C, a request to generate options associated with a task (e.g., that the user may intend to perform) may be received via the device (e.g., by the server). The task may be determined (e.g., identified, predicted, selected, etc.) based upon the request. In an example, one or more sentences of the request may be analyzed and/or scanned for keywords to determine the task.

At 410C, a first plurality of personality profiles may be selected from a second plurality of personality profiles, for the request, wherein each personality profile may represent at least one objective. The second plurality of personality profiles may be comprised within a personality profile database, wherein each personality profile comprises a name (e.g., character) and/or a graphic. Each personality profile may represent an objective associated with the task. The objective may comprise a preference associated with the task. For example, a first personality profile Cheetah comprising a first name (e.g., Cheetah), may represent a first objective (e.g., get to destination quickly). A second personality profile Sally comprising a second name (e.g., Sally), may represent a second objective (e.g., more natural scenery).

In some examples, information may be retrieved (e.g., by the server and/or the device) about (e.g., past) behavior, settings, age and/or a location of the device and/or the user. One or more personality profiles of the first plurality of personality profiles may be selected (e.g., automatically) based upon the information. In some examples, a portion of the second plurality of personality profiles and/or the second plurality of personality profiles may be presented (e.g., to the user). In some examples, the portion of the second plurality of personality profiles and/or the second plurality of personality profiles may be presented visually by displaying the portion of the second plurality of personality profiles and/or the second plurality of personality profiles on a screen graphically. Alternatively and/or additionally, the portion of the second plurality of personality profiles and/or the second plurality of personality profiles may be presented audibly by playing the portion of the second plurality of personality profiles and/or the second plurality of personality profiles on a speaker. In some examples, one or more interfaces may provide a platform for browsing, viewing, downloading and/or searching for personality profiles.

In some examples, the portion of the second plurality of personality profiles may be presented (e.g., to the user) based upon the information and/or one or more personality profiles (e.g., previously) selected from the second plurality of personality profiles. It may be appreciated that the selection of the portion of the second plurality of personality profiles (e.g., presented to the user) may be reflective of a determination that the user is likely to favor one or more personality profiles of the portion of the second plurality of personality profiles. One or more personality profiles of the second plurality of personality profiles may be selected by the user and/or the device. For example, a request to select the first personality profile Cheetah of the second plurality of personality profiles may be received (e.g., by the server and/or the device). Responsive to receiving the request, the first personality profile Cheetah may be selected and stored in a memory structure. The first personality profile Cheetah may (e.g., later) be retrieved from the memory structure and selected for a second task.

In some examples, a plurality of weights (e.g., priorities) corresponding to the first plurality of personality profiles selected from the second plurality of personality profiles may be determined. In some examples, a weight may indicate a priority, influence, importance, etc. of a personality profile of the first plurality of personality profiles. In some examples, the plurality of weights may be selected by the user and/or the device. Responsive to receiving the plurality of weights, the plurality of weights may be stored in a memory structure. The plurality of weights may (e.g., later) be retrieved from the memory structure (e.g., with the first plurality of personality profiles corresponding to the plurality of weights). In some examples, the plurality of weights may be (e.g., automatically) determined based upon the information, one or more personality profiles and/or one or more weights (e.g., previously) selected.

In some examples, an agent may be generated (e.g., by the server and/or the device) based upon the first plurality of personality profiles selected from the second plurality of personality profiles and/or the plurality of weights corresponding to the first plurality of personality profiles. The agent may comprise (e.g., and/or represent) the first plurality of personality profiles and/or the plurality of weights corresponding to the first plurality of personality profiles. The agent may be stored in a memory structure. The agent may (e.g., later) be retrieved from the memory structure for a second task. In some examples, the agent may be transmitted (e.g., shared) to one or more other devices using a network connection, a social network, an application, etc.

At 415C, an option database may be analyzed (e.g., and/or scanned) based upon the task and a first portion of the first plurality of personality profiles but not a second portion of the first plurality of personality profiles, to generate a plurality of options associated with the task. In some examples, the option database may be analyzed (e.g., and/or scanned) based upon context of the request. The context may comprise a location of the request (e.g., a location of the user and/or the device), a time of the request, an age of the user and/or a (e.g., past) behavior of the user and/or the device.

In some examples, the first portion of the first plurality of personality profiles (e.g., and/or the second portion of the first plurality of personality profiles) may be determined based upon (e.g., past) behavior, settings, age and/or a location of the device and/or the user. Alternatively and/or additionally, the first portion of the first plurality of personality profiles may be determined based upon (e.g., past) behaviors, settings, ages and/or locations associated with users other than the user.

In some examples, the first portion of the first plurality of personality profiles may be determined based upon one or more weights corresponding to one or more personality profiles of the first portion of the first plurality of personality profiles. For example, the top X (e.g., 1, 2, 3, 4 . . . )

weighted personality profiles may be selected as the first portion of the first plurality of personality profiles (e.g., to be used in analyzing the option database to generate the plurality of options). In an example, the first plurality of personality profiles may comprise the first personality profile Cheetah and the second personality profile Sally. A first weight of the first personality profile Cheetah may comprise a first value (e.g., 0.6) greater than a second value (e.g., 0.4) corresponding to a second weight of the second personality. The top weighted personality profile may be selected as the first portion of the first plurality of personality profiles. Accordingly, the first personality profile Cheetah may be selected as the first portion of the first plurality of personality profiles (e.g., to be used in analyzing the option database to generate the plurality of options).

In some examples, the first portion of the first plurality of personality profiles may be determined based upon one or more system resource usages corresponding to processing, memory management and/or network usage for analyzing the option database to generate the plurality of options based upon one or more personality profiles of the first portion of the first plurality of personality profiles. For example, one or more personality profiles corresponding to the bottom X (e.g., 1, 2, 3, 4 . . . ) system resource usages may be selected as the first portion of the first plurality of personality profiles (e.g., to be used in analyzing the option database to generate the plurality of options). In an example, the first plurality of personality profiles may comprise the first personality profile Cheetah and the second personality profile Sally. A first system resource usage corresponding to the first personality profile Cheetah may be less than a second system resource usage corresponding to the second personality profile Sally. A personality profile corresponding to the least system resource usage may be selected as the first portion of the first plurality of personality profiles. Accordingly, the first personality profile Cheetah may be selected as the first portion of the first plurality of personality profiles (e.g., to be used in analyzing the option database to generate the plurality of options).

At 420C, the plurality of options may be ranked based upon the first plurality of personality profiles to generate a ranked list of options. In some examples, the plurality of options may be ranked based upon the agent (e.g., the first plurality of personality profiles and/or the plurality of weights) to generate the ranked list. In some examples, the plurality of options may be (e.g., further) ranked based upon (e.g., past) behavior, settings, age and/or a location of the device and/or the user. Alternatively and/or additionally, the plurality of options may be (e.g., further) ranked based upon (e.g., past) behaviors, settings, ages and/or locations associated with users other than the user. For example, the plurality of options (e.g., for driving directions) may be ranked based upon the first personality profile Cheetah, the first weight, the second personality profile Sally and/or the second weight. Accordingly, the plurality of options may be ranked such that options that provide (e.g., a combination of) quicker routes and more natural scenery may be ranked above other options that provide (e.g., a combination of) less quick routes and less natural scenery.

It may be appreciated that in method 400C, the option database may be analyzed (e.g., and/or scanned) based upon the task and the first portion of the first plurality of personality profiles (e.g., and/or the one or more weights corresponding to the first portion of the first plurality of personality profiles) (e.g., but not the second portion of the first plurality of personality profiles) to generate the plurality of options. The plurality of options may (e.g., then) be ranked based upon the first plurality of personality profiles (e.g., including the first portion and/or the second portion) and/or the plurality of weights to generate the ranked list.

At 425C, at least a portion of the ranked list may be presented. In some examples, the ranked list may be presented (e.g., to the user). Alternatively and/or additionally, one or more options of the plurality of options (e.g., a portion of the ranked list) may be presented (e.g., to the user). In some examples, the one or more options and/or the ranked list may be presented visually by displaying the one or more options and/or the ranked list on a screen graphically. Alternatively and/or additionally, the one or more options and/or the ranked list may be presented audibly by playing the one or more options and/or the ranked list on a speaker. Alternatively and/or additionally, the one or more options and/or the ranked list may be used to control the device (e.g., and/or an associated device, such as one linked to the device via a network, a common user, etc.) in order to facilitate performance of the task.

In some examples, a determination may be made that the one or more options presented are ranked above a threshold (e.g., but that one or more other options in the plurality of options are not ranked above the threshold). The one or more options may thus be selected for presentation based upon the determination that the one or more options are ranked above the threshold (e.g., but that the one or more other options in the plurality of options may not be selected for presentation based upon the determination that they are not ranked above the threshold). For example, the top X (e.g., 1, 2, 3, 4 . . . ) ranked options of the list of ranked options may be selected for presentation. It may be appreciated that the selection of the one or more options may be reflective of a determination that the user is likely to favor the one or more options.

Figure 5A:
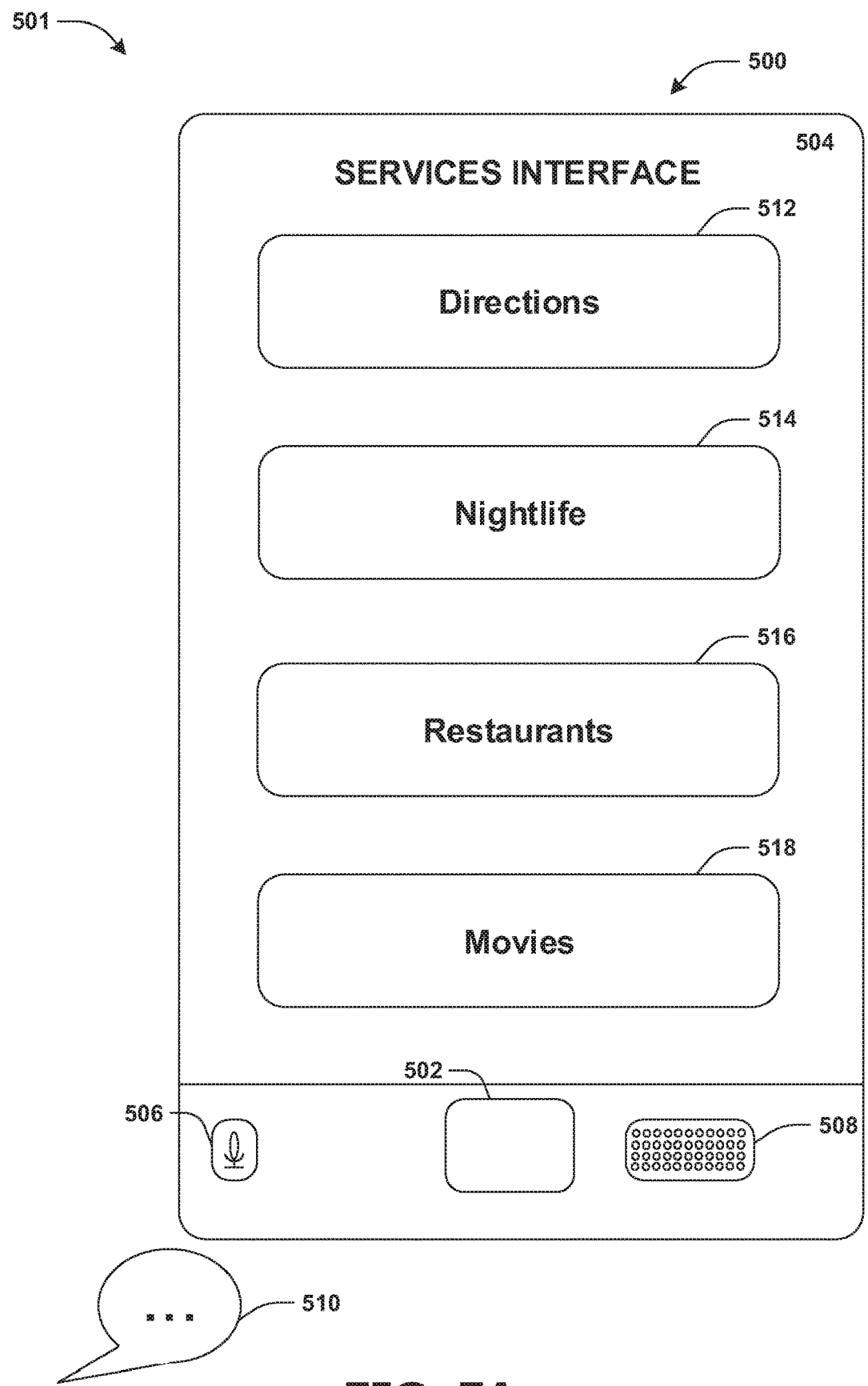
FIG. 5A is a component block diagram illustrating an example system for generating options associated with a task, where a request to generate options is received.

FIGS. 5A-5E illustrate examples of a system 501 for generating options associated with a task. A user, such as user Jill, may access and/or interact with one or more interfaces, such as a website, an application, etc. that provides services related to a task. FIG. 5A illustrates a device 500 of the user displaying a services interface. The device 500 may comprise a button 502, a microphone 506 and a speaker 508. The services interface may provide an area 504 for displaying graphics and/or text representing buttons, options and/or services. For example, the area 504 may comprise a directions button 512 corresponding to a first task for finding directions to a location, a nightlife button 514 corresponding to a second task for finding a place or activity during nighttime, a restaurants button 516 for finding a suitable restaurant and/or a movies button 518 for finding a suitable movie to watch.

In some examples, a request to generate options associated with the task may be received. The request may be received by using a conversational interface (e.g., a voice recognition and natural language interface), one or more buttons and/or a messaging interface. For example, audio 510 comprising speech may be received (e.g., from the user) via the microphone 506 and converted into a request for directions. For example, the audio 510 may comprise the user saying "I'd like directions to Civic Park", and voice recognition may be used to generate the request for directions. Alternatively and/or additionally, the request for directions may be received via a combination of the directions button 512, received audio and/or received text.

FIG. 5B illustrates a backend system 550 (e.g., on the device 500 of the user, on a server connected to the device via a network, etc.) that may receive the request for directions and/or may classify the request for directions as an input message 520. A task 522 may be determined (e.g., identified, predicted, selected, etc.) based upon the request for directions. For example, the backend system 550 may determine the task 522 "provide GPS directions for user from current location to Civic Park". In some examples, an option database may be analyzed (e.g., and/or scanned) based upon the task 522 to generate a plurality of options 524 associated with the task 522. For example, a first option "route via Meadowbrook Avenue", a second option "route via Lee Road" and/or a third option "route via Cedar Road" may be generated. In some examples, the option database may be analyzed (e.g., and/or scanned) based upon context of the request for directions (e.g., a location of the user and/or the device 500, a time of the request for directions, an age of the user and/or past behavior of the user and/or the device 500) to generate the plurality of options 524.

A first plurality of personality profiles 526 may be selected from a second plurality of personality profiles, wherein each personality profile represents an objective. In some examples, a plurality of weights may be determined corresponding to the first plurality of personality profiles 526. For example, a first personality profile Sam representing a first objective "get to destination quickly", a weight (e.g., 33% and/or normal priority) of the first personality profile Sam, a second personality profile Sally representing a second objective "more natural scenery", a weight (e.g., 33% and/or normal priority) of the second personality profile Sally, a third personality profile Harold representing a third objective "less heavy traffic" and/or a weight (e.g., 33% and/or normal priority) of the third personality profile Harold may be selected (e.g., and/or determined).

In some examples, one or more personality profiles of the first plurality of personality profiles 526 (e.g., and/or one or more weights corresponding to the one or more personality profiles) may be selected (e.g., automatically) based upon information (e.g., a location of the user and/or the device 500, a time of the request for directions, an age of the user and/or past behavior of the user and/or the device 500). Alternatively and/or additionally, one or more personality profiles of the first plurality of personality profiles 526 (e.g., and/or one or more weights corresponding to the one or more personality profiles) may be selected (e.g., by the user) (e.g., by using a platform for browsing, viewing, downloading and/or searching for personality profiles). Alternatively and/or additionally, the first plurality of personality profiles 526 (e.g., and/or the plurality of weights) may have previously been stored in a memory structure and linked to the user. Accordingly, the first plurality of personality profiles 526 may be selected by retrieving the first plurality of personality profiles 526 from the memory structure.

Figure 5C:
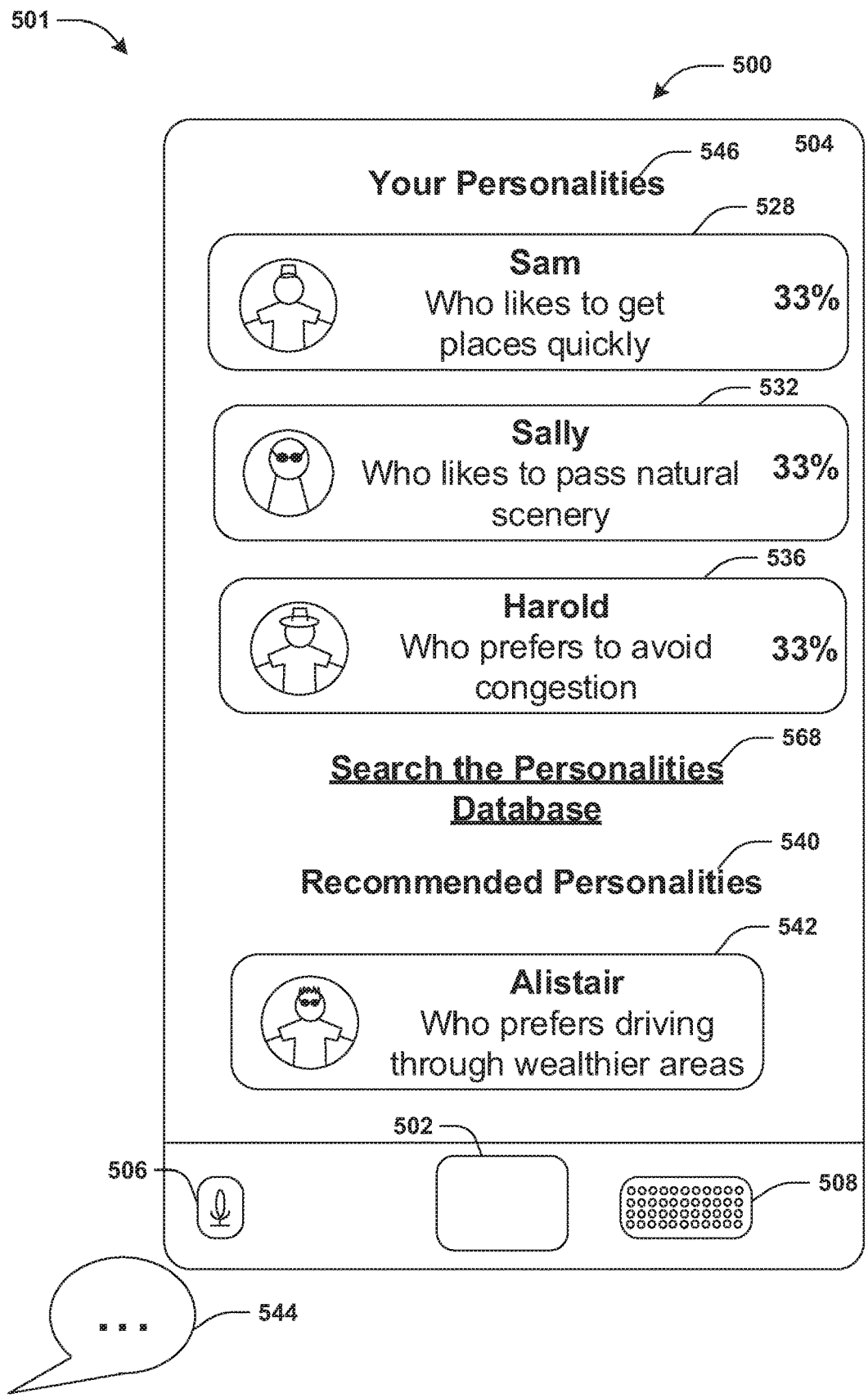
FIG. 5C is a component block diagram illustrating an example system for generating options associated with a task, where personality profiles are presented visually and/or audibly and a request to select a personality profile is received.

FIG. 5C illustrates the first plurality of personality profiles 526 and a portion of the second plurality of personality profiles being presented visually and/or audibly. A first section 546 "Your Personalities" of the area 504 may comprise a representation of previously selected personality profiles linked to the user. For example, the first section 546 may comprise a first graphical object 528 representing the first personality profile Sam, a second graphical object 532 representing the second personality profile Sally and/or a third graphical object 536 representing the third personality profile Harold.

The first graphical object 528 may comprise a name "Sam" of the first personality profile Sam, a graphic of the first personality profile Sam, a description of the first objective "Who likes to get places quickly" and the weight (e.g., 33% and/or normal priority) of the first personality profile Sam. The second graphical object 532 may comprise a name "Sally" of the second personality profile Sally, a graphic of the second personality profile Sally, a description of the second objective "Who likes to pass natural scenery" and the weight (e.g., 33% and/or normal priority) of the second personality profile Sally. The third graphical object 536 may comprise a name "Harold" of the third personality profile Harold, a description of the third objective "Who prefers to avoid congestion" and the weight (e.g., 33% and/or normal priority) of the third personality profile Harold.

In some examples, a link 568 "Search the Personalities Database" may direct the user to a platform for browsing, viewing, downloading and/or searching for personality profiles. In some examples, a second section 540 "Recommended Personalities" of the area 504 may comprise a representation of a portion of the second plurality of personality profiles.

In some examples, the portion of the second plurality of personality profiles may be selected for presentation to the user based upon a determination that the user is likely to favor one or more personality profiles of the portion of the second plurality of personality profiles. For example, the second section 540 may comprise a fourth graphical object 542 representing a fourth personality profile Alistair representing a fourth objective "drive through wealthy areas". In some examples, the fourth graphical object 542 may represent a button for selecting the fourth personality profile Alistair. In some examples, the fourth personality profile Alistair may be presented based upon a determination that the user is likely to favor the fourth personality profile Alistair (e.g., based upon past behavior, settings, age and/or a location of the device 500 and/or the user). In some examples, the fourth graphical object 542 may comprise a name "Alistair" of the fourth personality profile Alistair, a graphic of the fourth personality profile Alistair and a description of the fourth objective "Who prefers driving through wealthier areas".

In some examples, the first section 546 may be presented audibly. For example, audio of the first section 546 may be generated based upon the first personality profile Sam, the second personality profile Sally and/or the third personality profile Harold. The audio of the first section 546 may be output via the speaker 508. For example, the audio of the first section 546 may comprise "Your current personalities include Sam who likes to get places quickly at normal priority, Sally who likes to pass natural scenery at normal priority and Harold who prefers to avoid congestion at normal priority". In some examples, the second section 540 may be presented audibly. For example, audio of the second section 540 may be generated based upon the fourth personality profile Alistair. The audio of the second section 540 may be output via the speaker 508. For example, the audio of the second section 540 may comprise "Would you like to add Alistair who prefers driving through wealthier areas to your personalities?".

In some examples, a request to select the fourth personality profile Alistair may be received. For example, audio 544 comprising speech may be received (e.g., from the user) via the microphone 506 and converted into a request to select the fourth personality profile Alistair. For example, the audio 544 may comprise the user saying "I'd like to add Alistair with normal priority to my personalities" and voice recognition may be used to generate the request to select the fourth personality profile Alistair and determine a weight of the fourth personality profile Alistair. Alternatively and/or additionally, the request to select the fourth personality profile Alistair may be received by a combination of the button for selecting the fourth personality profile Alistair, received audio and/or received text.

FIG. 5D illustrates the backend system 550 for updating the first plurality of personality profiles 526 based upon the request to select the fourth personality profile Alistair and ranking the plurality of options 524. In some examples, an updated plurality of personality profiles 548 may be generated comprising the first personality profile Sam, the second personality profile Sally, the third personality profile Harold and the fourth personality profile Alistair. In some examples, the plurality of weights may be updated to generate an updated plurality of weights comprising an updated weight (e.g., 25% and/or normal priority) of the first personality profile Sam, an updated weight (e.g., 25% and/or normal priority) of the second personality profile Sally, an updated weight (e.g., 25% and/or normal priority) of the third personality profile Harold and an updated weight (e.g., 25% and/or normal priority) of the fourth personality profile Alistair. In some examples, the plurality of options 524 may be ranked based upon the updated plurality of personality profiles 548 to generate a ranked list 552 of options. For example, the ranked list 552 may comprise the third option "route via Cedar Road" as ranked first, the second option "route via Lee Road" as ranked second and the first option "route via Meadowbrook Avenue" as ranked third.

Figure 5E:
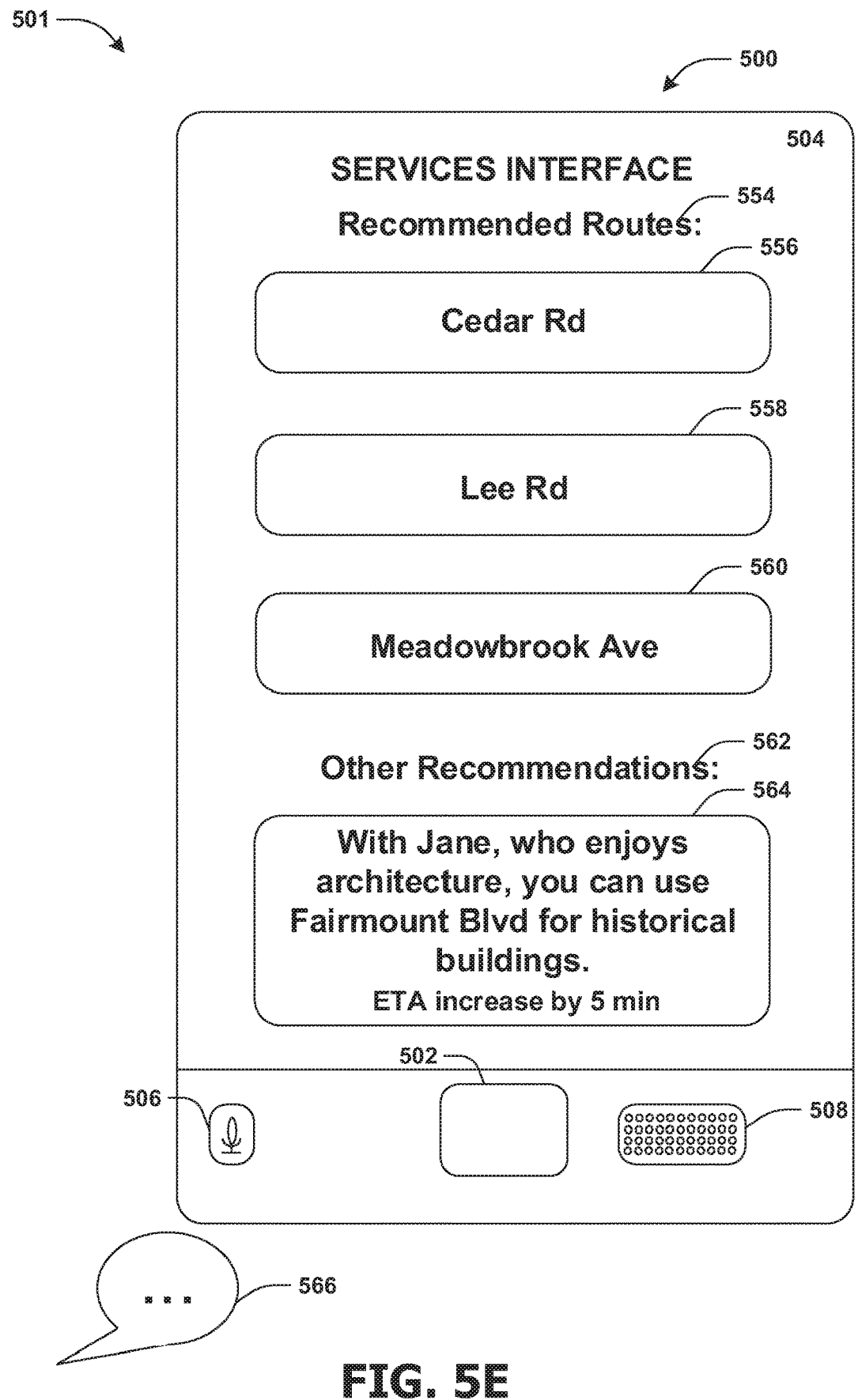
FIG. 5E is a component block diagram illustrating an example system for generating options associated with a task, where a ranked list and one or more alternative options are presented visually and/or audibly.

FIG. 5E illustrates the ranked list 552 and one or more alternative options other than the plurality of options 524 being presented visually and/or audibly. A third section 554 "Recommended Routes" of the area 504 may comprise a representation of the ranked list 552. For example, the third section 554 may comprise a fifth graphical object 556 representing the third option, a sixth graphical object 558 representing the second option and a seventh graphical object 560 representing the first option. In some examples, the fifth graphical object 556 may represent a button for selecting the third option, the sixth graphical object 558 may represent a button for selecting the second option and the seventh graphical object 560 may represent a button for selecting the first option.

In some examples, a fourth section 562 may comprise a representation of the one or more alternative options associated with one or more alternative personality profiles. It may be appreciated that the presentation of one or more alternative options and the one or more alternative personality profiles may be reflective of a determination that the user is likely to favor the one or more alternative options and/or the one or more alternative personality profiles. For example, the fourth section 562 may comprise an eighth graphical object 564 representing a first alternative option "Fairmount Blvd" associated with a first alternative personality profile Jane representing a fifth objective "drive past unique architecture and historical buildings". For example, the eighth graphical object 564 may comprise a description of the first alternative option, the first alternative personality profile Jane and/or ramifications of selecting the first alternative option and/or the first alternative personality profile Jane (e.g., "With Jane, who enjoys architecture, you can use Fairmount Blvd for historical buildings. ETA increase by 5 min"). In some examples, the eighth graphical object 564 may represent a button for selecting the first alternative option and/or the first alternative personality profile Jane.

In some examples, the third section 554 may be presented audibly. For example, audio of the third section 554 may be generated based upon the first option, the second option and the third option. The audio of the third section 554 may be output via the speaker 508. For example, the audio of the third section 554 may comprise "Your recommended routes are 1. Cedar Road 2. Lee Road 3. Meadowbrook Avenue". In some examples, the fourth section 562 may be presented audibly. For example, audio of the fourth section 562 may be generated based upon the first alternative option, the first alternative personality profile Jane and/or the ramifications of selecting the first alternative option and/or the first alternative personality profile Jane. The audio of the fourth section 562 may be output via the speaker 508. For example, the audio of the fourth section 562 may comprise "With Jane, who enjoys architecture, you can use Fairmount Blvd for historical buildings with a 5 minute increase to your ETA".

In some examples, a request to select one of the first option, the second option, the third option and/or the first alternative option may be received. The request may be received by using a conversational interface (e.g., a voice recognition and natural language interface), one or more buttons and/or a messaging interface. For example, audio 566 comprising speech may be received (e.g., from the user) via the microphone 506 and converted into a request to select an option. For example, the audio 566 may comprise the user saying "I'd like to use Lee Rd", and voice recognition may be used to generate the request to select the option. Alternatively and/or additionally, the request to select the option may be received via a combination of buttons corresponding to the first option, the second option, the third option and/or the first alternative option, received audio and/or received text.

The selected one or more options may be used to control the device 500 (e.g., and/or an associated device, such as one linked to the device via a network, a common user, etc.) in order to facilitate performance of the task.

Figure 6A:
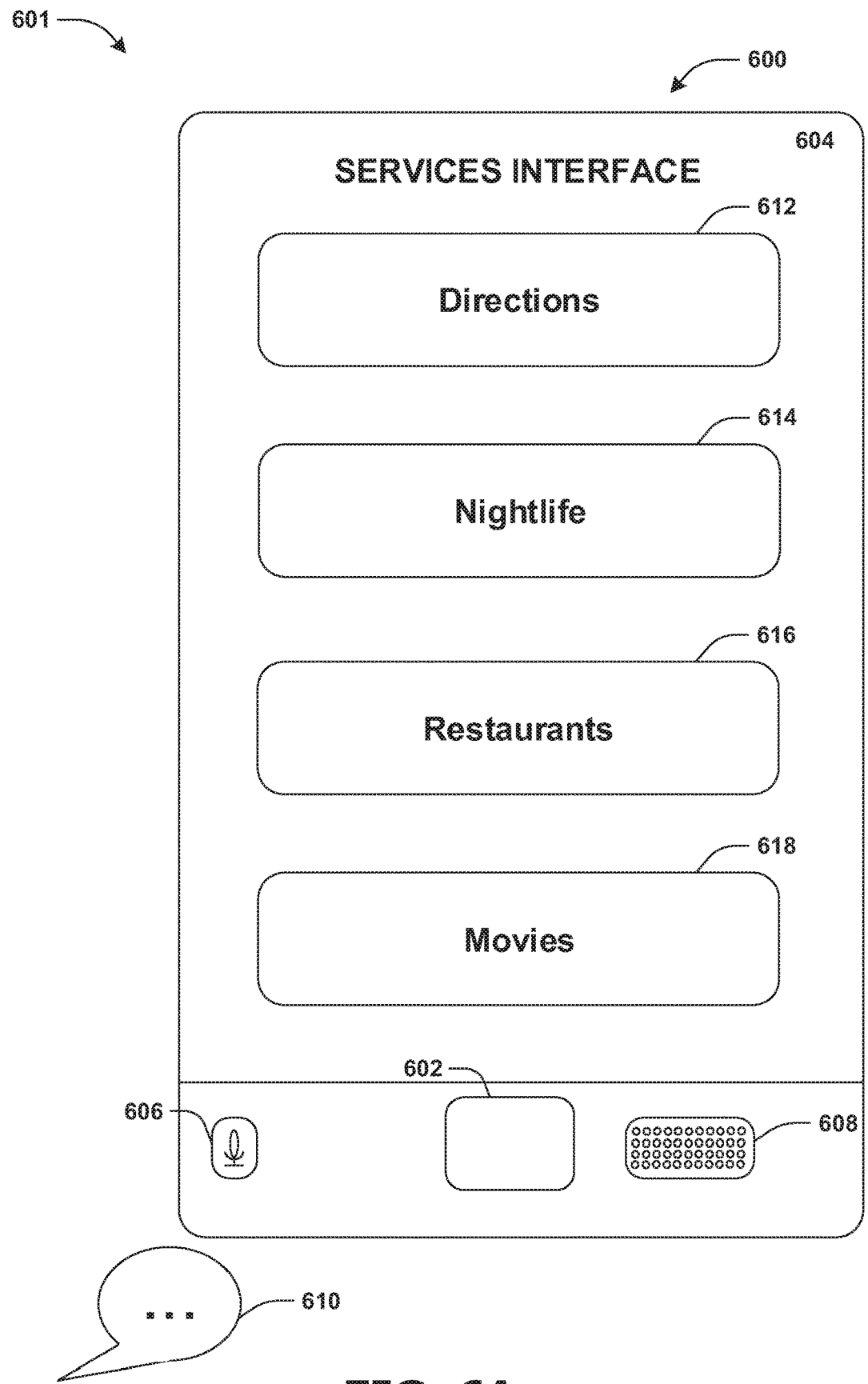
FIG. 6A is a component block diagram illustrating an example system for generating options associated with a task, where a request to generate options is received.

FIGS. 6A-6E illustrate examples of a system 601 for generating options associated with a task. A user, such as user Jill, may access and/or interact with one or more interfaces, such as a website, an application, etc. that provides services related to a task. FIG. 6A illustrates a device 600 of the user displaying a services interface. The device 600 may comprise a button 602, a microphone 606 and a speaker 608. The services interface may provide an area 604 for displaying graphics and/or text representing buttons, options and/or services. For example, the area 604 may comprise a directions button 612 corresponding to a first task for finding directions to a location, a nightlife button 614 corresponding to a second task for finding a place or activity during nighttime, a restaurants button 616 for finding a suitable restaurant and/or a movies button 618 for finding a suitable movie to watch.

In some examples, a request to generate options associated with the task may be received. The request may be received by using a conversational interface (e.g., a voice recognition and natural language interface), one or more buttons and/or a messaging interface. For example, audio 610 comprising speech may be received (e.g., from the user) via the microphone 606 and converted into a request for restaurant options. For example, the audio 610 may comprise the user saying "I'd like to go to a restaurant", and voice recognition may be used to generate the request for restaurant options. Alternatively and/or additionally, the request for restaurant options may be received via a combination of the restaurants button 616, received audio and/or received text.

Figure 6B:
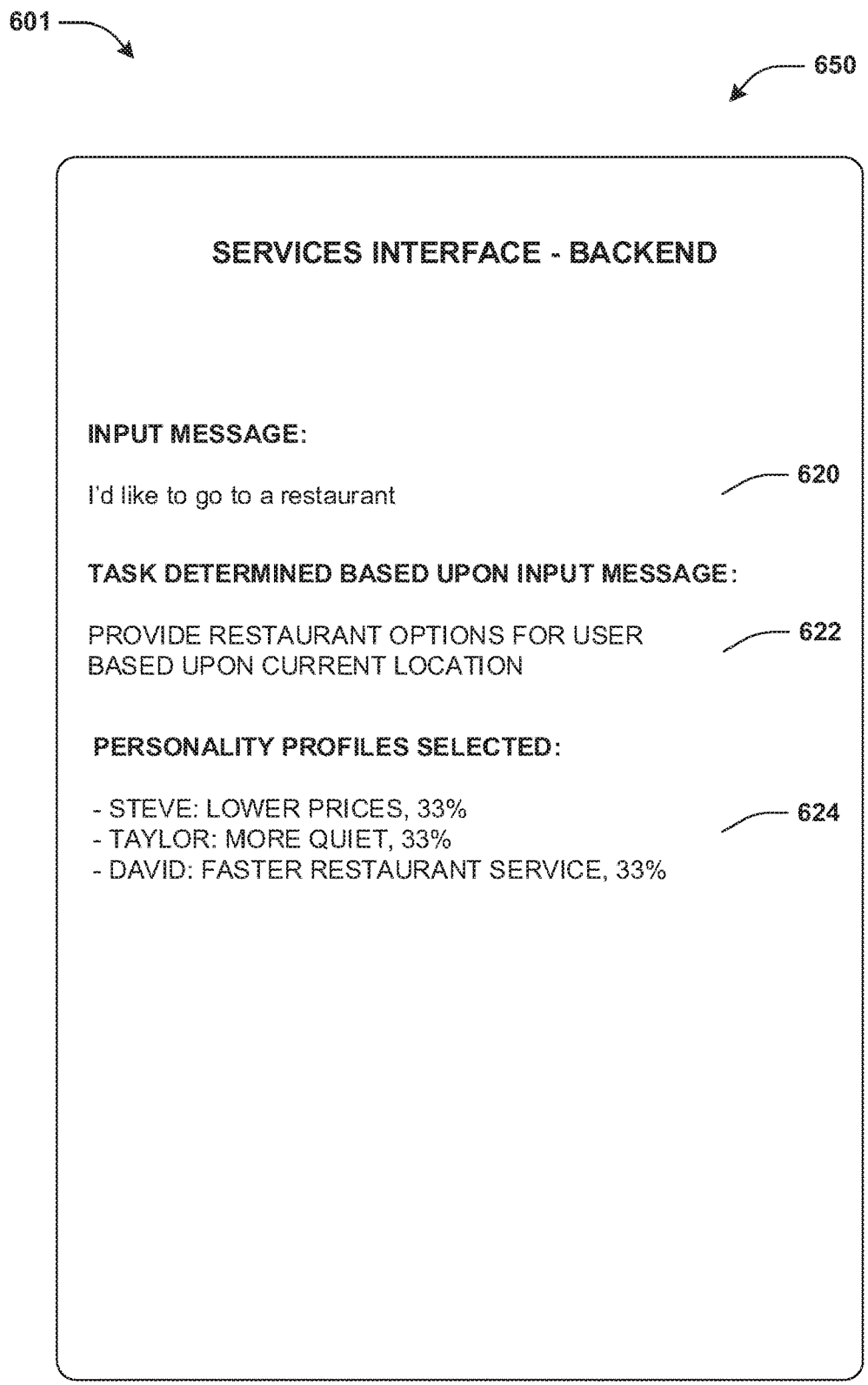
FIG. 6B is a component block diagram illustrating an example system for generating options associated with a task, where a task is determined.

FIG. 6B illustrates a backend system 650 (e.g., on the device 600 of the user, on a server connected to the device via a network, etc.) that may receive the request for restaurant options and/or may classify the request for restaurant options as an input message 620. A task 622 may be determined (e.g., identified, predicted, selected, etc.) based upon the request for restaurant options. For example, the backend system 650 may determine the task 622 "provide restaurant options for user based upon current location".

A first plurality of personality profiles 624 may be selected from a second plurality of personality profiles, wherein each personality profile represents an objective. In some examples, a plurality of weights may be determined corresponding to the first plurality of personality profiles 624. For example, a first personality profile Steve representing a first objective "lower prices", a weight (e.g., 33% and/or normal priority) of the first personality profile Steve, a second personality profile Taylor representing a second objective "more quiet", a weight (e.g., 33% and/or normal priority) of the second personality profile Taylor, a third personality profile David representing a third objective "faster restaurant service" and/or a weight (e.g., 33% and/or normal priority) of the third personality profile David may be selected (e.g., and/or determined). The weights may be selected based upon user input, determined based upon default settings, and/or calculated based upon information, behavior, history, etc. of the user.

Figure 6C:
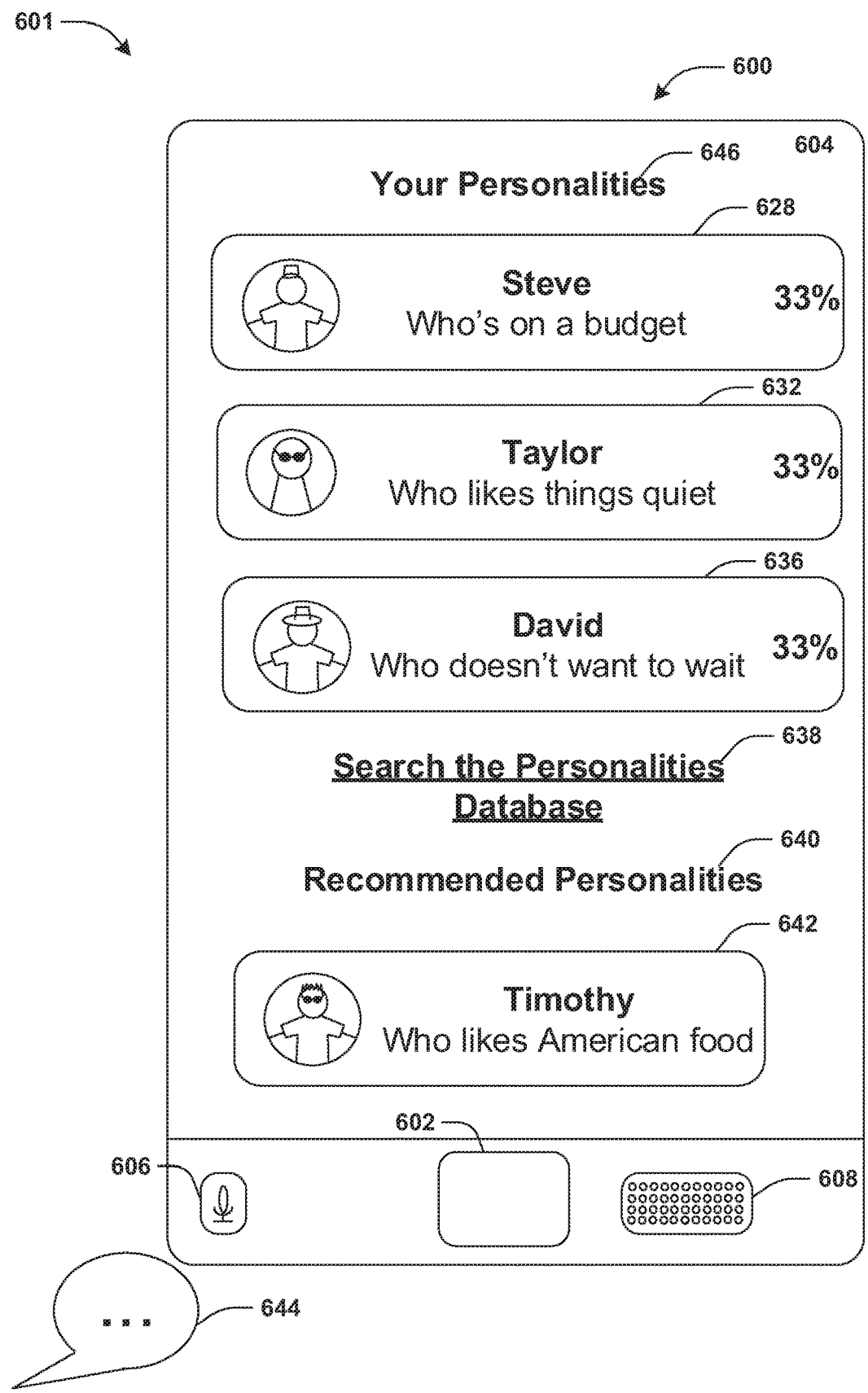
FIG. 6C is a component block diagram illustrating an example system for generating options associated with a task, where personality profiles are presented visually and/or audibly and a request to select a personality profile is received.

FIG. 6C illustrates the first plurality of personality profiles 624 and a portion of the second plurality of personality profiles being presented visually and/or audibly. A first section 646 "Your Personalities" of the area 604 may comprise a representation of previously selected personality profiles linked to the user. For example, the first section 646 may comprise a first graphical object 628 representing the first personality profile Steve, a second graphical object 632 representing the second personality profile Taylor and/or a third graphical object 636 representing the third personality profile David. The first graphical object 628 may comprise a name "Steve" of the first personality profile Steve, a graphic of the first personality profile Steve, a description of the first objective "Who's on a budget" and the weight (e.g., 33% and/or normal priority) of the first personality profile Steve. The second graphical object 632 may comprise a name "Taylor" of the second personality profile Taylor, a graphic of the second personality profile Taylor, a description of the second objective "Who likes things quiet" and the weight (e.g., 33% and/or normal priority) of the second personality profile Taylor. The third graphical object 636 may comprise a name "David" of the third personality profile David, a description of the third objective "Who doesn't want to wait" and the weight (e.g., 33% and/or normal priority) of the third personality profile David.

In some examples, a link 638 "Search the Personalities Database" may direct the user to a platform for browsing, viewing, downloading and/or searching for personality profiles. In some examples, a second section 640 "Recommended Personalities" of the area 604 may comprise a representation of a portion of the second plurality of personality profiles.

In some examples, the portion of the second plurality of personality profiles may be selected for presentation to the user based upon a determination that the user is likely to favor one or more personality profiles of the portion of the second plurality of personality profiles. For example, the second section 640 may comprise a fourth graphical object 642 representing a fourth personality profile Timothy representing a fourth objective "American food". In some examples, the fourth graphical object 642 may represent a button for selecting the fourth personality profile Timothy. In some examples, the fourth personality profile Timothy may be presented based upon a determination that the user is likely to favor the fourth personality profile Timothy (e.g., based upon past behavior, settings, age and/or a location of the device 600 and/or the user). In some examples, the fourth graphical object 642 may comprise a name "Timothy" of the fourth personality profile Timothy, a graphic of the fourth personality profile Timothy and a description of the fourth objective "Who likes American food".

In some examples, the first section 646 may be presented audibly. For example, audio of the first section 646 may be generated based upon the first personality profile Steve, the second personality profile Taylor and/or the third personality profile David. The audio of the first section 646 may be output via the speaker 608. For example, the audio of the first section 646 may comprise "Your current personalities include Steve who's on a budget at normal priority, Taylor who likes things quiet at normal priority and David who doesn't want to wait at normal priority". In some examples, the second section 640 may be presented audibly. For example, audio of the second section 640 may be generated based upon the fourth personality profile Timothy. The audio of the second section 640 may be output via the speaker 608. For example, the audio of the second section 640 may comprise "Would you like to add Timothy who likes American food to your personalities?".

In some examples, a request to select the fourth personality profile Timothy may be received. For example, audio 644 comprising speech may be received (e.g., from the user) via the microphone 606 and converted into a request to select the fourth personality profile Timothy. For example, the audio 644 may comprise the user saying "I'd like to add Timothy with high priority to my personalities" and voice recognition may be used to generate the request to select the fourth personality profile Timothy and determine a weight of the fourth personality profile Timothy. Alternatively and/or additionally, the request to select the fourth personality profile Timothy may be received by a combination of the button for selecting the fourth personality profile Timothy, received audio and/or received text.

FIG. 6D illustrates the backend system 650 for updating the first plurality of personality profiles 624 based upon the request to select the fourth personality profile and generate a ranked list 652 of options. In some examples, an updated plurality of personality profiles 648 may be generated comprising the first personality profile Steve, the second personality profile Taylor, the third personality profile David and the fourth personality profile Timothy. In some examples, the plurality of weights may be updated to generate an updated plurality of weights comprising an updated weight (e.g., 20% and/or normal priority) of the first personality profile Steve, an updated weight (e.g., 20% and/or normal priority) of the second personality profile Taylor, an updated weight (e.g., 20% and/or normal priority) of the third personality profile David and an updated weight (e.g., 40% and/or high priority) of the fourth personality profile Timothy. The weights may be selected based upon user input, determined based upon default settings, and/or calculated based upon information, behavior, history, etc. of the user.

In some examples, an option database may be analyzed (e.g., and/or scanned) based upon the updated plurality of personality profiles 648 and the task 622 to generate the ranked list 652 associated with the task 622. For example, a plurality of options may be generated based upon the updated plurality of personality profiles 648 and the task 622. The plurality of options may then be ranked based upon the updated plurality of personality profiles 648 to generate the ranked list 652. For example, the ranked list 652 may comprise a first option "Burgers To-Go" ranked first, a second option "Fried Chicken World" ranked second and a third option "Sandwich Paradise" ranked third.

Figure 6E:
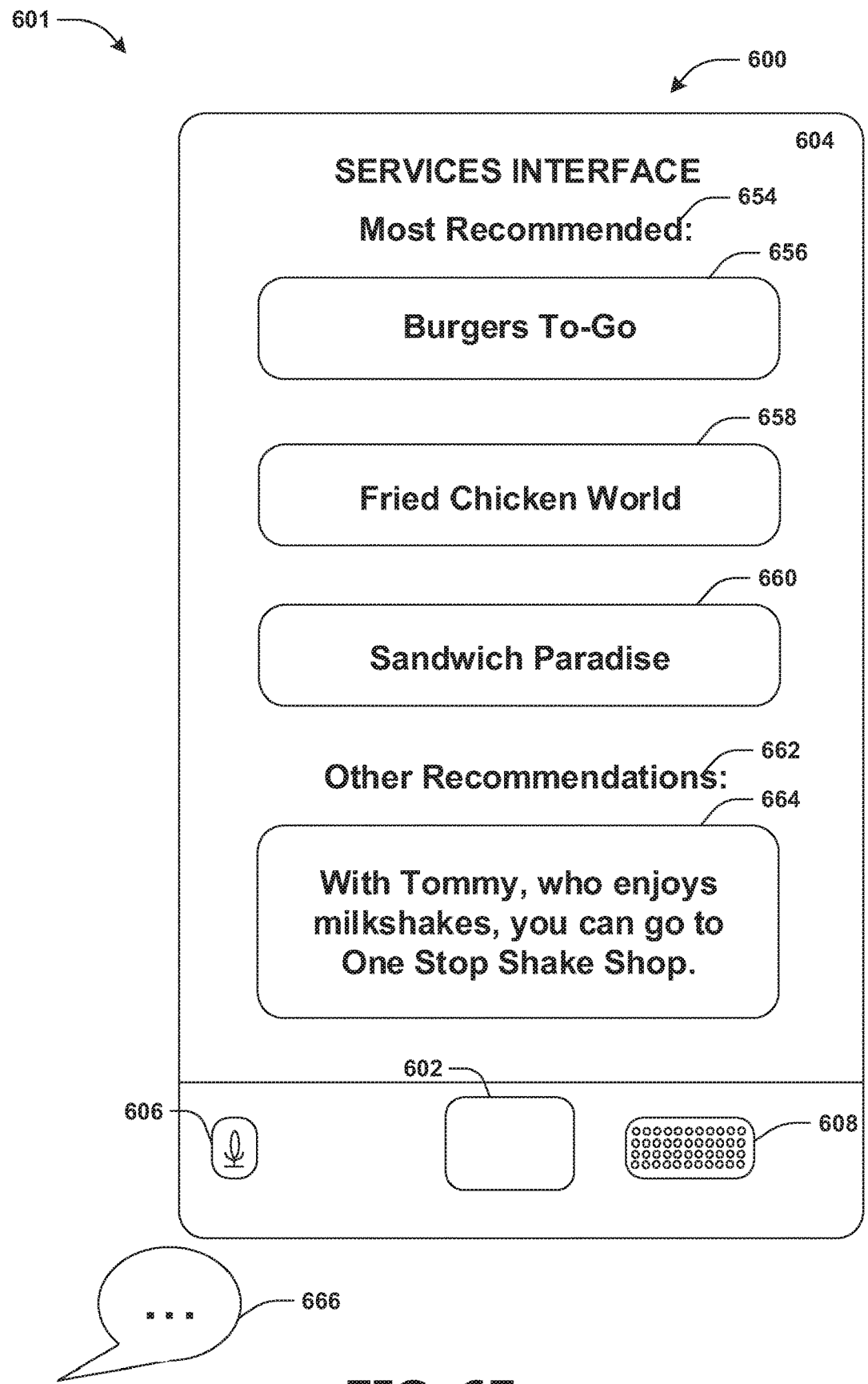
FIG. 6E is a component block diagram illustrating an example system for generating options associated with a task, where a ranked list and one or more alternative options are presented visually and/or audibly.

FIG. 6E illustrates the ranked list 652 and one or more alternative options other than the plurality of options being presented visually and/or audibly. A third section 654 "Most Recommended" of the area 604 may comprise a representation of the ranked list 652. For example, the third section 654 may comprise a fifth graphical object 656 representing the first option, a sixth graphical object 658 representing the second option and a seventh graphical object 660 representing the third option. In some examples, the fifth graphical object 656 may represent a button for selecting the first option, the sixth graphical object 658 may represent a button for selecting the second option and the seventh graphical object 660 may represent a button for selecting the third option. In some examples, a fourth section 662 may comprise a representation of the one or more alternative options associated with one or more alternative personality profiles.

It may be appreciated that presentation of the one or more alternative options and the one or more alternative personality profiles may be reflective of a determination that the user is likely to favor the one or more alternative options and/or the one or more alternative personality profiles. For example, the fourth section 662 may comprise an eighth graphical object 664 representing a first alternative option "One Stop Shake Shop" associated with a first alternative personality profile Tommy representing a fifth objective "milkshakes". For example, the eighth graphical object 664 may comprise a description of the first alternative option, the first alternative personality profile Tommy and/or ramifications of selecting the first alternative option and/or the first alternative personality profile Tommy (e.g., "With Tommy, who enjoys milkshakes, you can go to One Stop Shake Shop"). In some examples, the eighth graphical object 664 may represent a button for selecting the first alternative option and/or the first alternative personality profile Tommy.

In some examples, the third section 654 may be presented audibly. For example, audio of the third section 654 may be generated based upon the first option, the second option and the third option. The audio of the third section 654 may be output via the speaker 608. For example, the audio of the third section 654 may comprise "Your recommended restaurants are 1. Burgers To-Go 2. Fried Chicken World 3. Sandwich Paradise". In some examples, the fourth section 662 may be presented audibly. For example, audio of the fourth section 662 may be generated based upon the first alternative option, the first alternative personality profile Tommy and/or the ramifications of selecting the first alternative option and/or the first alternative personality profile Tommy. The audio of the fourth section 662 may be output via the speaker 608. For example, the audio of the fourth section 662 may comprise "With Tommy, who enjoys milkshakes, you can go to One Stop Shake Shop".

In some examples, a request to select one of the first option, the second option, the third option and/or the first alternative option may be received. The request may be received by using a conversational interface (e.g., a voice recognition and natural language interface), one or more buttons and/or a messaging interface. For example, audio 666 comprising speech may be received (e.g., from the user) via the microphone 506 and converted into a request to select an option. For example, the audio 666 may comprise the user saying "I'd like to go to Sandwich Paradise", and voice recognition may be used to generate the request to select the option. Alternatively and/or additionally, the request to select the option may be received via a combination of buttons corresponding to the first option, the second option, the third option and/or the first alternative option, received audio and/or received text.

The selected one or more options may be used to control the device 600 (e.g., and/or an associated device, such as one linked to the device via a network, a common user, etc.) in order to facilitate performance of the task.

Figure 7A:
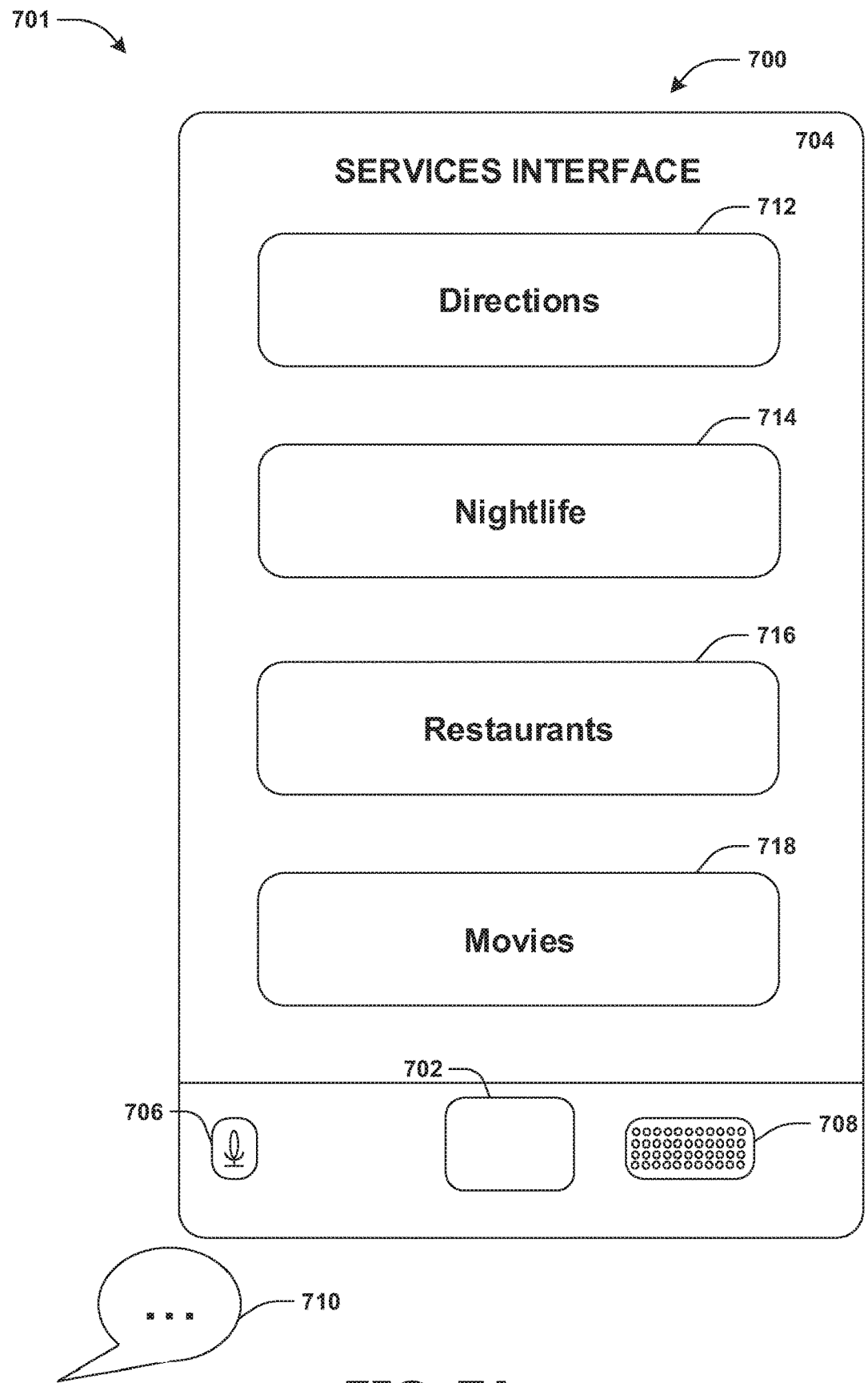
FIG. 7A is a component block diagram illustrating an example system for generating options associated with a task, where a request to generate options is received.

FIGS. 7A-7E illustrate examples of a system 701 for generating options associated with a task. A user, such as user Jill, may access and/or interact with one or more interfaces, such as a website, an application, etc. that provides services related to a task. FIG. 7A illustrates a device 700 of the user displaying a services interface. The device 700 may comprise a button 702, a microphone 706 and a speaker 708. The services interface may provide an area 704 for displaying graphics and/or text representing buttons, options and/or services. For example, the area 704 may comprise a directions button 712 corresponding to a first task for finding directions to a location, a nightlife button 714 corresponding to a second task for finding a place or activity during nighttime, a restaurants button 716 for finding a suitable restaurant and/or a movies button 718 for finding a suitable movie to watch.

In some examples, a request to generate options associated with the task may be received. The request may be received by using a conversational interface (e.g., a voice recognition and natural language interface), one or more buttons and/or a messaging interface. For example, audio 710 comprising speech may be received (e.g., from the user) via the microphone 706 and converted into a request for movie options. For example, the audio 710 may comprise the user saying "I'd like to watch a movie", and voice recognition may be used to generate the request for movie options. Alternatively and/or additionally, the request for movie options may be received via a combination of the movies button 718, received audio and/or received text.

FIG. 7B illustrates a backend system 750 (e.g., on the device 700 of the user, on a server connected to the device via a network, etc.) that may receive the request for movie options and/or may classify the request for movie options as an input message 720. A task 722 may be determined (e.g., identified, predicted, selected, etc.) based upon the request for movie options. For example, the backend system 750 may determine the task 722 "provide movie options for user".

A first plurality of personality profiles 724 may be selected from a second plurality of personality profiles, wherein each personality profile represents an objective. In some examples, a plurality of weights may be determined corresponding to the first plurality of personality profiles 724. For example, a first personality profile Daniel representing a first objective "drama movies", a weight (e.g., 40% and/or high priority) of the first personality profile Daniel, a second personality profile Natalie representing a second objective "movies with famous actors", a weight (e.g., 30% and/or normal priority) of the second personality profile Natalie, a third personality profile George representing a third objective "critically acclaimed movies" and/or a weight (e.g., 30% and/or normal priority) of the third personality profile George may be selected (e.g., and/or determined).

In some examples, an option database may be analyzed (e.g., and/or scanned) based upon the task 722 and a first portion of the first plurality of personality profiles 724 to generate a plurality of options 726 associated with the task 722. In some examples, the first personality profile Daniel may be selected as the first portion of the first plurality of personality profiles 724 based upon behavior, settings, age and/or a location of the device 700 and/or the user, based upon behaviors, settings, ages and/or locations associated with users other than the user, based upon the plurality of weights and/or based upon one or more system resource usages of (e.g., each of) the first plurality of personality profiles 724. For example, a first option "A Shoe in the Sky", a second option "The Dilemma in the Midwest" and/or a third option "The New Rule" may be generated. In some examples, the option database may be analyzed (e.g., and/or scanned) based upon context of the request for movie options (e.g., a location of the user and/or the device 700, a time of the request for movie options, an age of the user and/or past behavior of the user and/or the device 700) to generate the plurality of options 726.

Figure 7C:
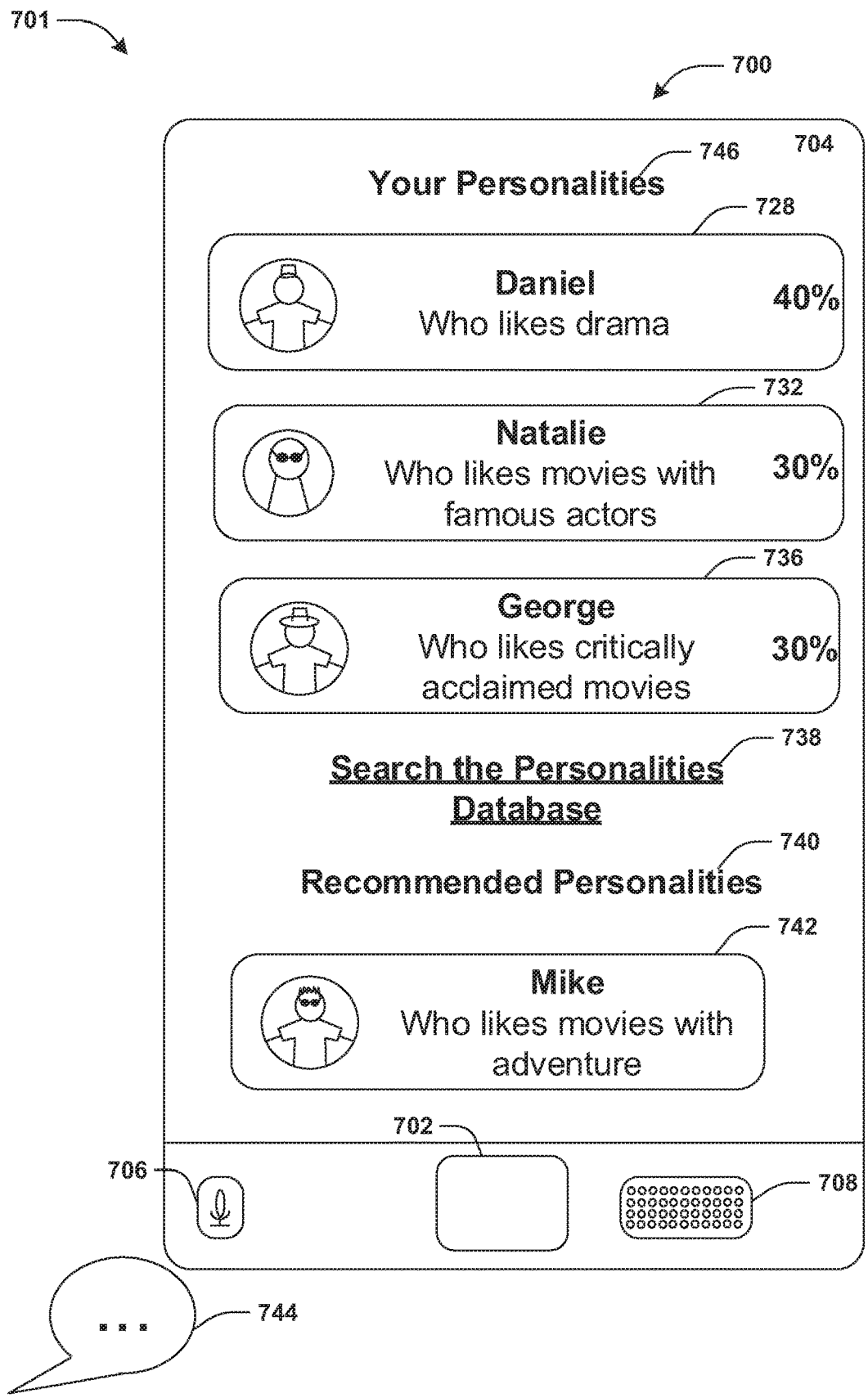
FIG. 7C is a component block diagram illustrating an example system for generating options associated with a task, where personality profiles are presented visually and/or audibly and a request to select a personality profile is received.

FIG. 7C illustrates the first plurality of personality profiles 724 and a portion of the second plurality of personality profiles being presented visually and/or audibly. A first section 746 "Your Personalities" of the area 704 may comprise a representation of previously selected personality profiles linked to the user. For example, the first section 746 may comprise a first graphical object 728 representing the first personality profile Daniel, a second graphical object 732 representing the second personality profile Natalie and/or a third graphical object 736 representing the third personality profile George. The first graphical object 728 may comprise a name "Daniel" of the first personality profile Daniel, a graphic of the first personality profile Daniel, a description of the first objective "Who likes drama" and the weight (e.g., 40% and/or high priority) of the first personality profile Daniel. The second graphical object 732 may comprise a name "Natalie" of the second personality profile Natalie, a graphic of the second personality profile Natalie, a description of the second objective "Who likes movies with famous actors" and the weight (e.g., 30% and/or normal priority) of the second personality profile Natalie. The third graphical object 736 may comprise a name "George" of the third personality profile George, a description of the third objective "Who likes critically acclaimed movies" and the weight (e.g., 30% and/or normal priority) of the third personality profile George. In some examples, a link 738 "Search the Personalities Database" may direct the user to a platform for browsing, viewing, downloading and/or searching for personality profiles. In some examples, a second section 740 "Recommended Personalities" of the area 704 may comprise a representation of a portion of the second plurality of personality profiles. In some examples, the portion of the second plurality of personality profiles may be selected for presentation to the user based upon a determination that the user is likely to favor one or more personality profiles of the portion of the second plurality of personality profiles. For example, the second section 740 may comprise a fourth graphical object 742 representing a fourth personality profile Mike representing a fourth objective "adventure movies". In some examples, the fourth graphical object 742 may represent a button for selecting the fourth personality profile Mike. In some examples, the fourth personality profile Mike may be presented based upon a determination that the user is likely to favor the fourth personality profile Mike (e.g., based upon past behavior, settings, age and/or a location of the device 700 and/or the user). In some examples, the fourth graphical object 742 may comprise a name "Mike" of the fourth personality profile Mike, a graphic of the fourth personality profile Mike and a description of the fourth objective "Who likes movies with adventure".

In some examples, the first section 746 may be presented audibly. For example, audio of the first section 746 may be generated based upon the first personality profile Daniel, the second personality profile Natalie and/or the third personality profile George. The audio of the first section 746 may be output via the speaker 708. For example, the audio of the first section 746 may comprise "Your current personalities include Daniel who likes drama at high priority, Natalie who likes movies with famous actors at normal priority and George who likes critically acclaimed movies at normal priority". In some examples, the second section 740 may be presented audibly. For example, audio of the second section 740 may be generated based upon the fourth personality profile Mike. The audio of the second section 740 may be output via the speaker 708. For example, the audio of the second section 740 may comprise "Would you like to add Mike who likes movies with adventure to your personalities?".

In some examples, a request to select the fourth personality profile Mike may be received. For example, audio 744 comprising speech may be received (e.g., from the user) via the microphone 706 and converted into a request to select the fourth personality profile Mike. For example, the audio 744 may comprise the user saying "I'd like to add Mike with low priority to my personalities" and voice recognition may be used to generate the request to select the fourth personality profile Mike and determine a weight of the fourth personality profile Mike. Alternatively and/or additionally, the request to select the fourth personality profile Mike may be received by a combination of the button for selecting the fourth personality profile Mike, received audio and/or received text.

FIG. 7D illustrates the backend system 750 for updating the first plurality of personality profiles 724 based upon the request to select the fourth personality profile and ranking the plurality of options 726. In some examples, an updated plurality of personality profiles 748 may be generated comprising the first personality profile Daniel, the second personality profile Natalie, the third personality profile George and the fourth personality profile Mike. In some examples, the plurality of weights may be updated to generate an updated plurality of weights comprising an updated weight (e.g., 30% and/or high priority) of the first personality profile Daniel, an updated weight (e.g., 20% and/or normal priority) of the second personality profile Natalie, an updated weight (e.g., 20% and/or normal priority) of the third personality profile George and an updated weight (e.g., 30% and/or high priority) of the fourth personality profile Mike. In some examples, the plurality of options 726 may be ranked based upon the updated plurality of personality profiles 748 to generate a ranked list 752 of options. For example, the ranked list 752 may comprise the second option "The Dilemma in the Midwest" as ranked first, the first option "A Shoe in the Sky" as ranked second and the third option "The New Rule" as ranked third. The weights may be selected based upon user input, determined based upon default settings, and/or calculated based upon information, behavior, history, etc. of the user.

Figure 7E:
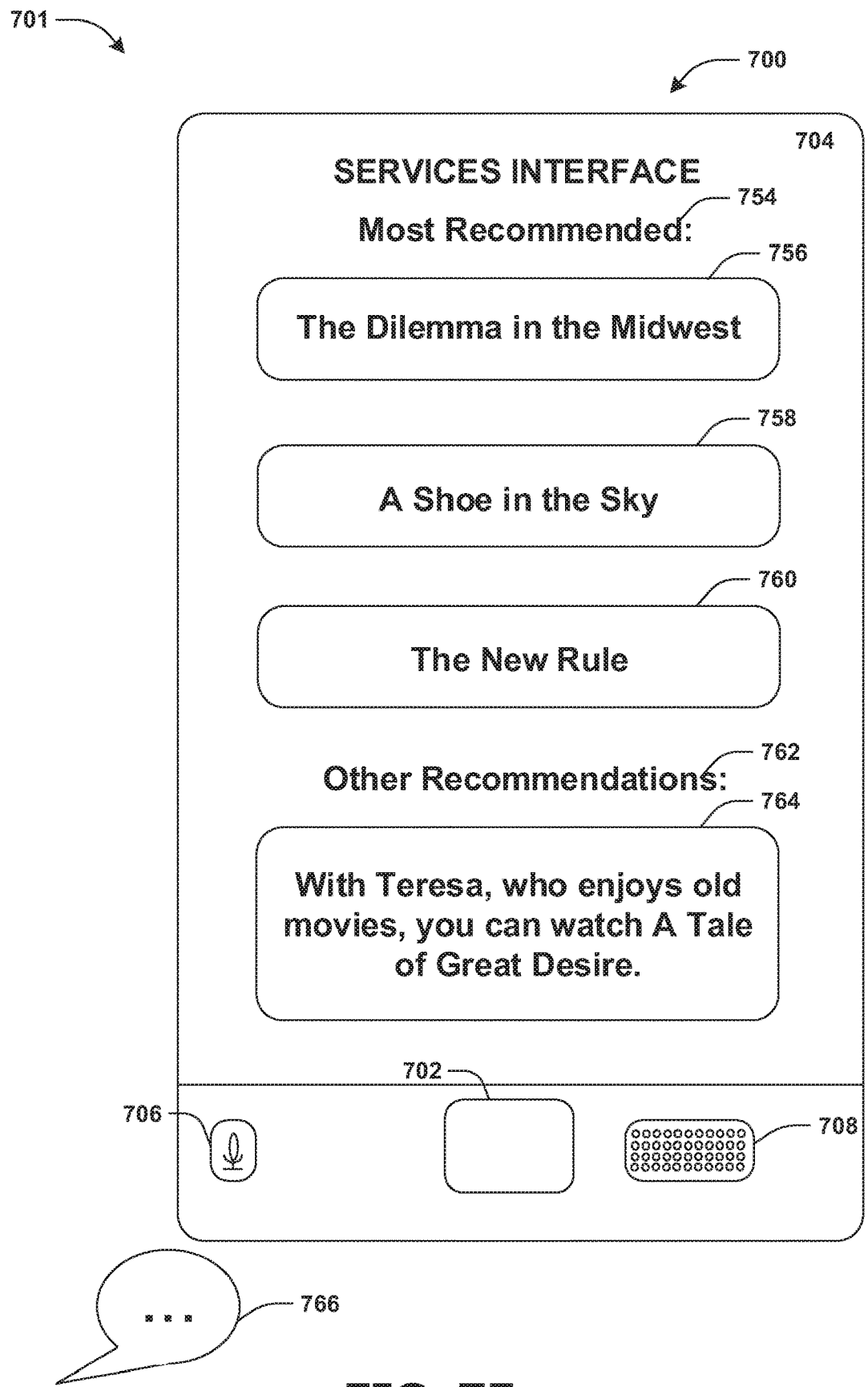
FIG. 7E is a component block diagram illustrating an example system for generating options associated with a task, where a ranked list and one or more alternative options are presented visually and/or audibly.

FIG. 7E illustrates the ranked list 752 and one or more alternative options other than the plurality of options 726 being presented visually and/or audibly. A third section 754 "Most Recommended" of the area 704 may comprise a representation of the ranked list 752. For example, the third section 754 may comprise a fifth graphical object 756 representing the second option, a sixth graphical object 758 representing the first option and a seventh graphical object 760 representing the third option. In some examples, the fifth graphical object 756 may represent a button for selecting the second option, the sixth graphical object 758 may represent a button for selecting the first option and the seventh graphical object 760 may represent a button for selecting the third option. In some examples, a fourth section 762 may comprise a representation of the one or more alternative options associated with one or more alternative personality profiles.

It may be appreciated that presentation of the one or more alternative options and the one or more alternative personality profiles may be reflective of a determination that the user is likely to favor the one or more alternative options and/or the one or more alternative personality profiles. For example, the fourth section 762 may comprise an eighth graphical object 764 representing a first alternative option "A Tale of Great Desire" associated with a first alternative personality profile Teresa representing a fifth objective "old movies". For example, the eighth graphical object 764 may comprise a description of the first alternative option, the first alternative personality profile Teresa and/or ramifications of selecting the first alternative option and/or the first alternative personality profile Teresa (e.g., "With Teresa, who enjoys old movies, you can watch A Tale of Great Desire"). In some examples, the eighth graphical object 764 may represent a button for selecting the first alternative option and/or the first alternative personality profile Teresa.

In some examples, the third section 754 may be presented audibly. For example, audio of the third section 754 may be generated based upon the first option, the second option and the third option. The audio of the third section 754 may be output via the speaker 708. For example, the audio of the third section 754 may comprise "Your recommended movies are 1. The Dilemma in the Midwest 2. A Shoe in the Sky 3. The New Rule". In some examples, the fourth section 762 may be presented audibly. For example, audio of the fourth section 762 may be generated based upon the first alternative option, the first alternative personality profile Teresa and/or the ramifications of selecting the first alternative option and/or the first alternative personality profile Teresa. The audio of the fourth section 762 may be output via the speaker 708. For example, the audio of the fourth section 762 may comprise "With Teresa, who enjoys old movies, you can watch A Tale of Great Desire".

In some examples, a request to select one of the first option, the second option, the third option and/or the first alternative option may be received. The request may be received by using a conversational interface (e.g., a voice recognition and natural language interface), one or more buttons and/or a messaging interface. For example, audio 766 comprising speech may be received (e.g., from the user) via the microphone 506 and converted into a request to select an option. For example, the audio 766 may comprise the user saying "I'd like to watch The New Rule", and voice recognition may be used to generate the request to select the option. Alternatively and/or additionally, the request to select the option may be received via a combination of buttons corresponding to the first option, the second option, the third option and/or the first alternative option, received audio and/or received text.

The selected one or more options may be used to control the device 700 (e.g., and/or an associated device, such as one linked to the device via a network, a common user, etc.) in order to facilitate performance of the task.

It may be appreciated that the disclosed subject matter may assist a user (e.g., and/or a device associated with the user) in performing various tasks, finding various suitable options for performing the tasks and/or determining various objectives used to determine (e.g., and/or generate) the options.

Implementation of at least some of the disclosed subject matter may lead to improvements to technology including, but not limited to, improving the functionality of an interface, such as a graphical user interface or an audio interface, by providing an efficient way for users to select objectives used to determine options for performance of a task (e.g., as a result of presenting personality profiles corresponding to objectives based upon information associated with a user that the user may choose from, as a result of providing a platform for users to browse, view, download and/or search for personality profiles that the user may select, etc.). Such improvements may also lead to decreased processor usage, reduction in time used to perform tasks, and an ability to identify best options for performing a task using a plurality of objectives in a manner that would otherwise involve a plurality of dimensions and thus be associated with a level of complexity incapable of being addressed with existing techniques.

Alternatively and/or additionally, implementation of at least some of the disclosed subject matter may lead to improvements to technology including improving the functionality of an interface, such as a graphical user interface or an audio interface, by providing a simple way for users for users to select weights (e.g., priorities, influence, importance, etc.) for (e.g., each) of the objectives (e.g., as a result of allowing the user to select values corresponding to the weights of the objectives, as a result of allowing the user to select weight options corresponding to the weights, etc.).

Alternatively and/or additionally, implementation of at least some of the disclosed subject matter may lead to improvements to technology including improving the functionality of an interface, such as a graphical user interface or an audio interface, by automatically selecting objectives corresponding to the tasks suitable for the user (e.g., as a result of retrieving information about behavior, settings, age and/or a location of the user, as a result of automatically selecting personal profiles for the user based upon the information, etc.).

Alternatively and/or additionally, implementation of at least some of the disclosed subject matter may lead to improvements to technology including improving the functionality of an interface, such as a graphical user interface or an audio interface, by automatically selecting weights of the objectives corresponding to the tasks (e.g., as a result of retrieving the information about behavior, settings, age and/or a location of the user, as a result of automatically determining the weights corresponding to the objectives based upon the information, etc.).

Alternatively and/or additionally, implementation of at least some of the disclosed subject matter may lead to improvements to technology including improving the functionality of an interface, such as a graphical user interface or an audio interface, by controlling the presentation of content (e.g., advertisements) to the user based upon an identification of content that the user is likely to respond to (e.g., as a result of analyzing selected personality profiles and/or weights to determine advertisements to present to the user, presenting the advertisements to the user visually and/or audibly, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 8:
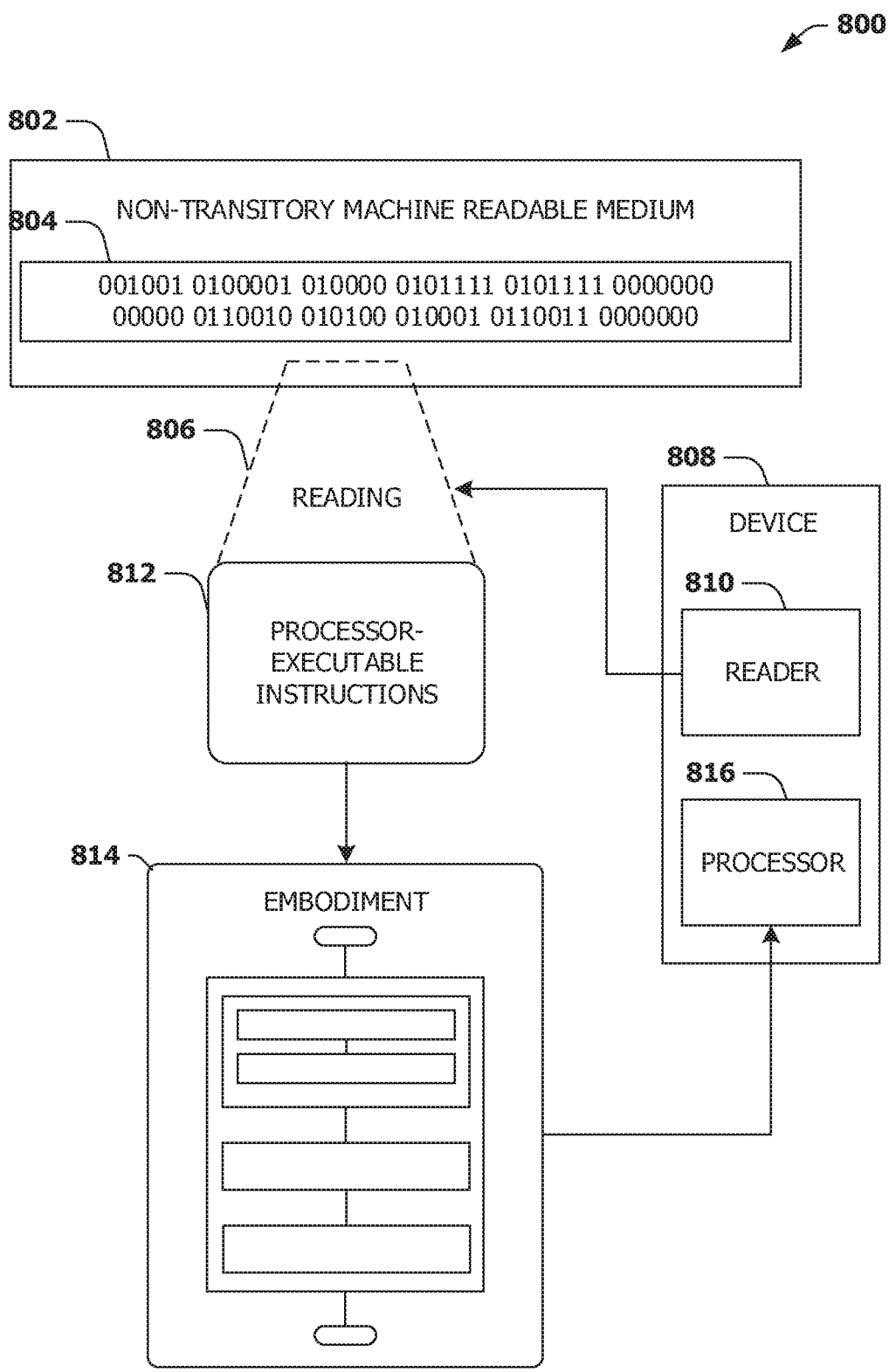
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400A of FIG. 4A, the example method 400B of FIG. 4B and/or the example method 400C of FIG. 4C, for example. In some embodiments, the processor-executable instructions 812 are configured to cause implementation of a system, such as at least some of the example system 501 of FIGS. 5A-5E, the example system 601 of FIGS. 6A-6E and/or the example system 701 of FIGS. 7A-7E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    receiving a request to generate options associated with a task via a device;
    responsive to receiving the request, analyzing an option database based upon the task to generate a plurality of options associated with the task;
    presenting, to the device, a platform for accessing personality profiles;
    responsive to receiving a request to download at least one personality profile via the platform, providing the at least one personality profile to the device;
    presenting a plurality of personality profiles each representing at least one objective, wherein the plurality of personality profiles comprises the at least one personality profile;
    receiving a selection of one or more personality profiles from the plurality of personality profiles, for the request to generate options;
    ranking the plurality of options based upon the one or more personality profiles to generate a ranked list of options; and
    presenting at least a portion of the ranked list.

2. The method of claim 1, wherein the selection of the one or more personality profiles comprises selection of a first personality profile representing a first objective and selection of a second personality profile representing a second objective.

3. The method of claim 1, comprising prior to the presenting a plurality of personality profiles:
retrieving information about at least one of behavior, settings, or a location of at least one of the device or a user associated with the device from a memory structure; and
selecting the plurality of personality profiles from a personality profile database based upon the information.

4. The method of claim 1, comprising:
determining one or more weights corresponding to the one or more personality profiles, wherein the ranking the plurality of options is based upon the one or more weights.

5. The method of claim 4, the one or more weights determined by at least one of:
receiving a first weight from a user associated with the device; or
retrieving a second weight from a memory structure.

6. The method of claim 4, comprising:
generating an agent based upon the one or more personality profiles and the one or more weights; and
transmitting the agent to one or more other devices via at least one of a network connection, a social network or an application.

7. The method of claim 1, comprising at least one of:
receiving a request to select a first personality profile of the plurality of personality profiles, wherein the first personality profile is selected; or
retrieving a second personality profile of the plurality of personality profiles from a memory structure, wherein the second personality profile is selected.

8. The method of claim 1, comprising:
analyzing the option database further based upon a context of the request to generate options, wherein the context comprises at least one of a location of the request to generate options, a time of the request to generate options or an age of a user associated with the request to generate options.

9. The method of claim 1, comprising:
retrieving information about at least one of behavior, settings, or a location of at least one of the device or a user associated with the device from a memory structure;
determining at least one of an alternative option or an alternative personality profile based upon at least one of the information or the one or more personality profiles; and
presenting at least one of the alternative option or the alternative personality profile.

10. The method of claim 1, comprising:
analyzing the one or more personality profiles to determine one or more advertisements based upon the one or more personality profiles; and
presenting the one or more advertisements.

11. The method of claim 1, wherein each personality profile of the plurality of personality profiles comprises at least one of a name or a graphic.

12. The method of claim 1, wherein the platform comprises two or more personality profiles available for at least one of download or purchase.

13. A method, comprising:
receiving a request to generate options associated with a task via a device;
presenting, to the device, a platform for accessing personality profiles;
responsive to receiving a request to download at least one personality profile via the platform, providing the at least one personality profile to the device;
presenting a plurality of personality profiles each representing at least one objective, wherein the plurality of personality profiles comprises the at least one personality profile;
receiving a selection of one or more personality profiles from the plurality of personality profiles, for the request to generate options;
analyzing an option database based upon the task and the one or more personality profiles to generate a ranked list of options associated with the task; and
presenting at least a portion of the ranked list.

14. The method of claim 13, comprising:
retrieving information about at least one of behavior, settings, or a location of at least one of the device or a user associated with the device from a memory structure, wherein a personality profile is selected based upon the information.

15. The method of claim 13, wherein the selection of the one or more personality profiles comprises selection of a first personality profile representing a first objective and selection of a second personality profile representing a second objective.

16. The method of claim 13, comprising:
determining one or more weights corresponding to the one or more personality profiles, wherein the generating the ranked list of options is based upon the one or more weights.

17. A method, comprising:
receiving a request to generate options associated with a task via a device;
presenting, to the device, a platform for accessing personality profiles;
responsive to receiving a request to download at least one personality profile via the platform, providing the at least one personality profile to the device;
presenting a second plurality of personality profiles each representing at least one objective, wherein the second plurality of personality profiles comprises the at least one personality profile;
receiving a selection of a first plurality of personality profiles from the second plurality of personality profiles, for the request to generate options;
analyzing an option database based upon the task and a portion of the first plurality of personality profiles but not a second portion of the first plurality of personality profiles to generate a plurality of options associated with the task;
ranking the plurality of options based upon the first plurality of personality profiles to generate a ranked list of options; and
presenting at least a portion of the ranked list of options.

18. The method of claim 17, comprising:
retrieving information about at least one of behavior, settings, or a location of at least one of the device or a user associated with the device from a memory structure, wherein a personality profile is selected based upon the information.

19. The method of claim 17, comprising:
presenting at least one of a portion of the second plurality of personality profiles or the second plurality of personality profiles; and
receiving a request to select a personality profile of the second plurality of personality profiles.

20. The method of claim 17, comprising:
determining a plurality of weights corresponding to the first plurality of personality profiles, wherein at least one of the generating the plurality of options or ranking the plurality of options is based upon the plurality of weights.

* * * * *